United States Patent [19]

Hirai

[11] 4,290,082

[45] Sep. 15, 1981

[54] NOISE AND CROSS-TALK ELIMINATION IN RECORDING AND REPRODUCING VIDEO SIGNALS

[75] Inventor: Jun Hirai, Tokyo, Japan

[73] Assignee: Sony Corporation, Tokyo, Japan

[21] Appl. No.: 971,678

[22] Filed: Dec. 21, 1978

Related U.S. Application Data

[63] Continuation of Ser. No. 812,329, Jul. 1, 1977, abandoned.

[30] Foreign Application Priority Data

Jul. 6, 1976 [JP] Japan .................................. 51/80127
Feb. 28, 1977 [JP] Japan .................................. 52/21850

[51] Int. Cl.$^3$ ........................ H04N 9/493; H04N 5/91
[52] U.S. Cl. ............................................ 358/8; 360/33
[58] Field of Search ................... 358/4, 8, 36; 360/24, 360/30, 33, 55; 333/14; 179/1 P

[56] References Cited

U.S. PATENT DOCUMENTS

| 3,288,930 | 11/1966 | Johnson | 179/1 P |
|---|---|---|---|
| 3,728,475 | 4/1973 | Inoue et al. | 360/30 |
| 3,729,693 | 4/1973 | Dolby | 179/1 P |

FOREIGN PATENT DOCUMENTS

| 2239831 | 2/1975 | France . | |
|---|---|---|---|
| 1030444 | 5/1966 | United Kingdom . | |
| 1068247 | 5/1967 | United Kingdom . | |
| 1082619 | 9/1967 | United Kingdom . | |
| 1170432 | 11/1969 | United Kingdom . | |
| 1361539 | 7/1974 | United Kingdom . | |
| 1379774 | 1/1975 | United Kingdom . | |

Primary Examiner—John C. Martin
Attorney, Agent, or Firm—Lewis H. Eslinger; Alvin Sinderbrand

[57] ABSTRACT

In apparatus for recording and reproducing video signals in successive parallel tracks of reduced width and without guard bands therebetween so as to achieve a high recording density on the magnetic tape or other record medium, and in which a high frequency portion of the video signals, for example, the luminance component of color video signals, is frequency modulated for the recording thereof, processing circuits are operative in the recording and reproducing modes of operation to act on the luminance component prior to its frequency modulation in recording and after its demodulation in reproducing, respectively, for substantially eliminating from the demodulated luminance component the usual FM noise signal and also any interfering signal due to cross-talk, for example, as results from a lack of H-alignment between the signals recorded in adjacent tracks when the apparatus is intended to be operated with two different tape speeds. Such processing circuits provide non-linear pre-emphasis and substantially complementary non-linear de-emphasis in recording and reproducing, respectively, with the amounts of pre-emphasis and de-emphasis being dependent on the level and frequency of the signal being recorded and reproduced and preferably also dependent on the level-frequency characteristic of the interfering signal due to cross-talk appearing on reproduction.

60 Claims, 34 Drawing Figures

FIG. I

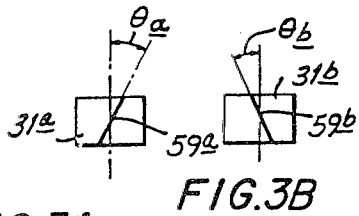
FIG.3A   FIG.3B
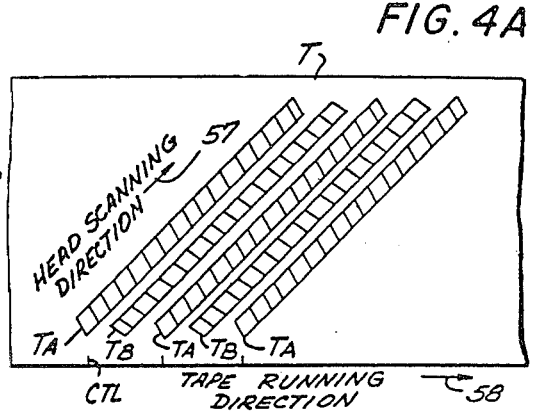
FIG.4A
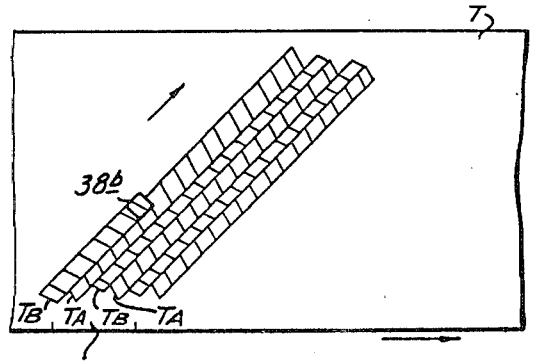
FIG.4B
FIG.5
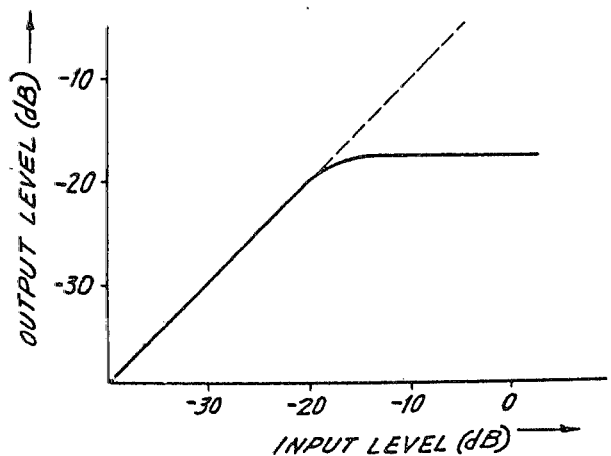

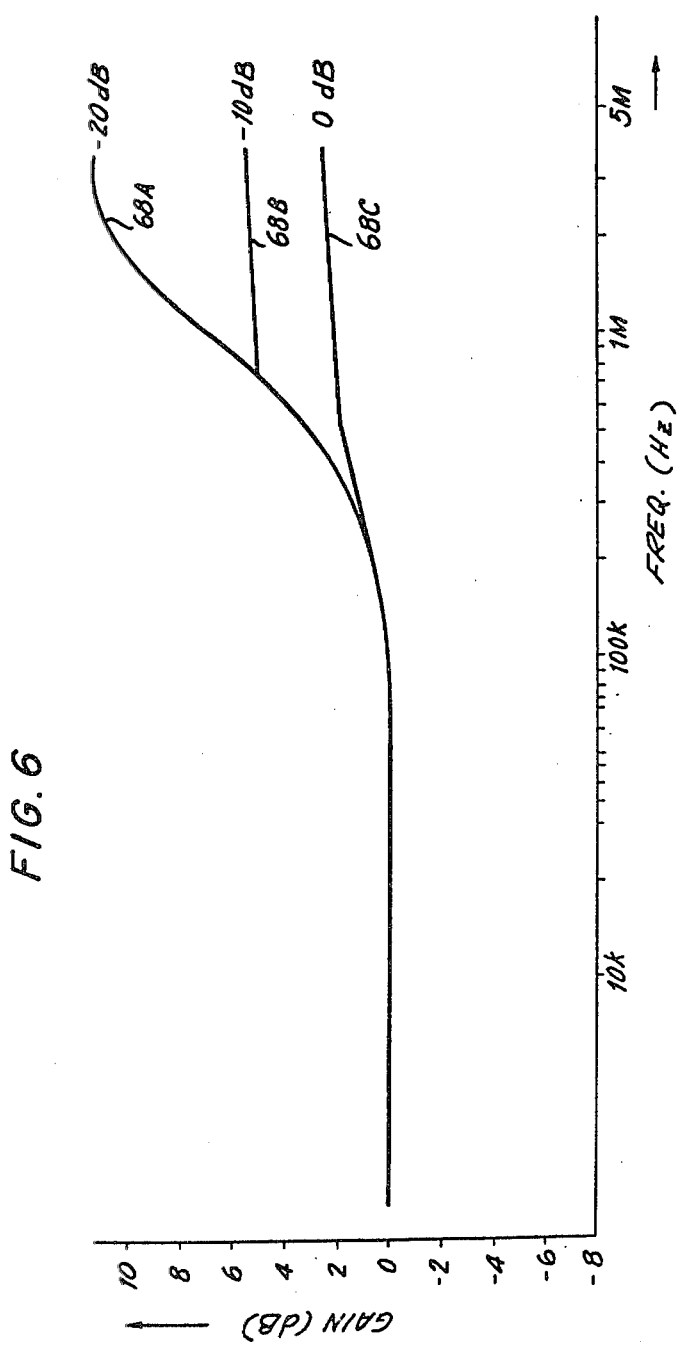

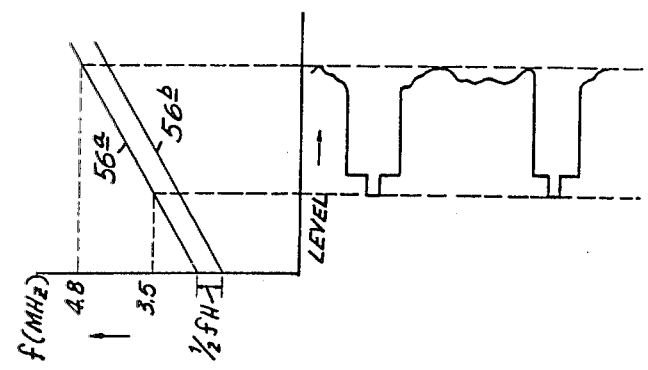
FIG.8
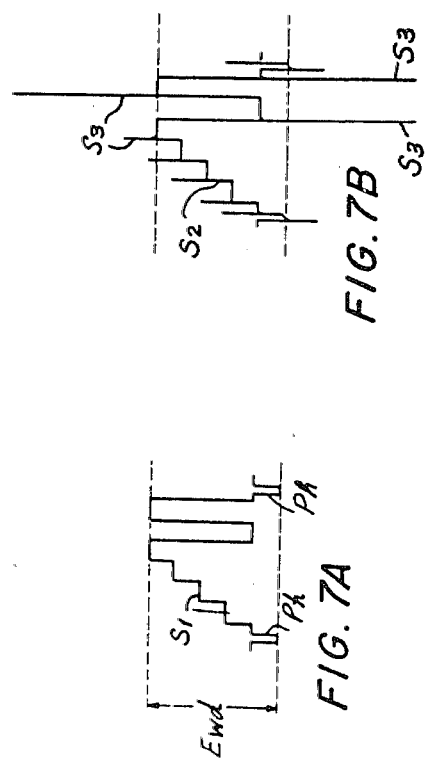
FIG.7B
FIG.7A
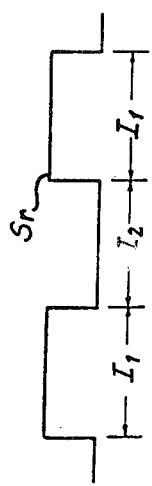
FIG.9

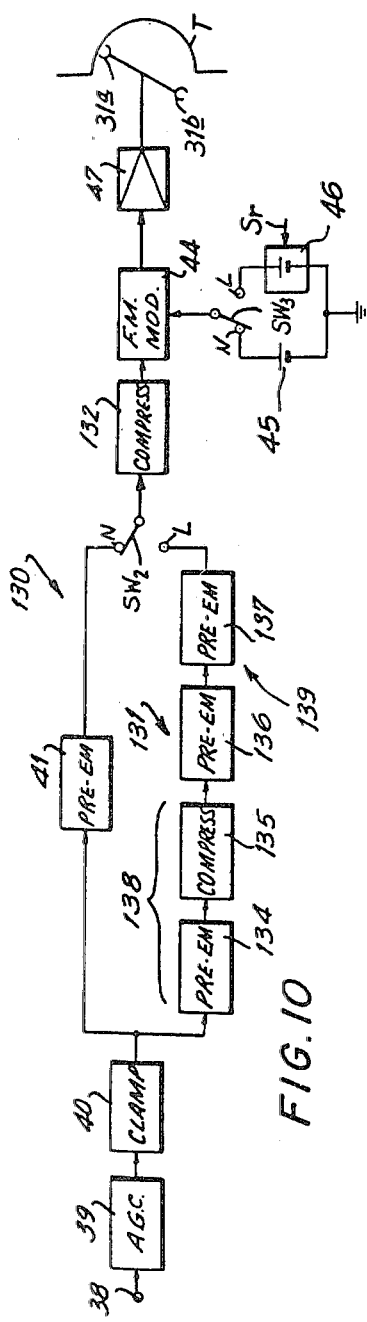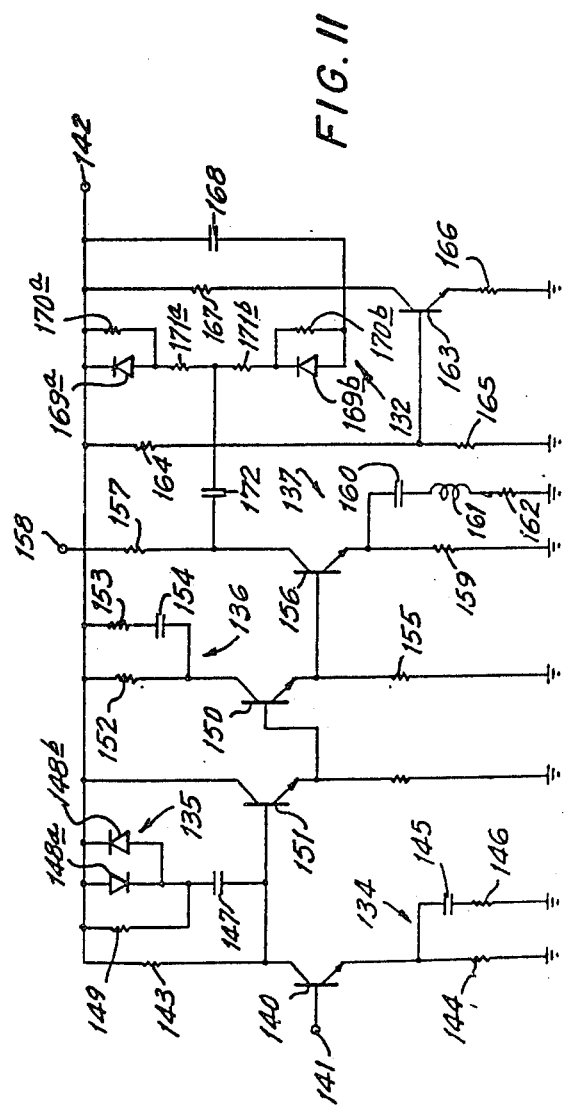
FIG. 10
FIG. 11

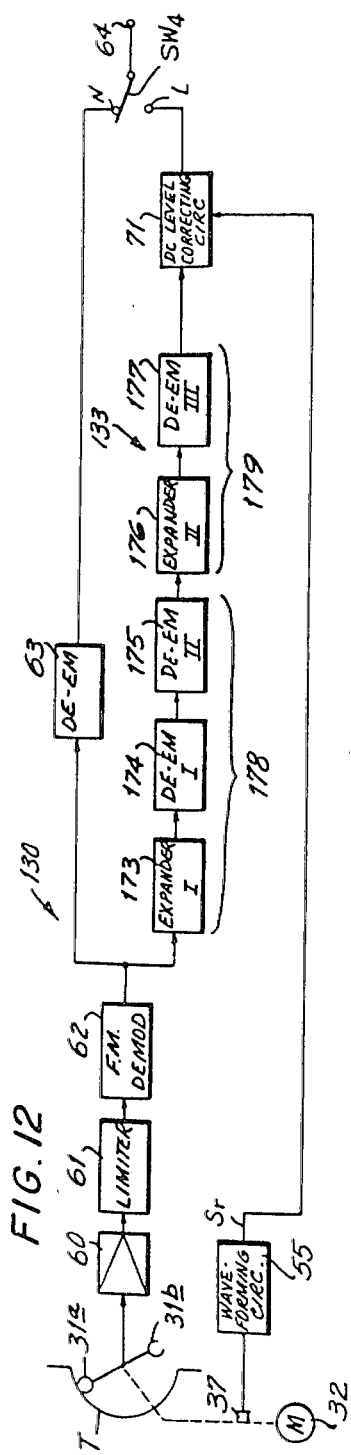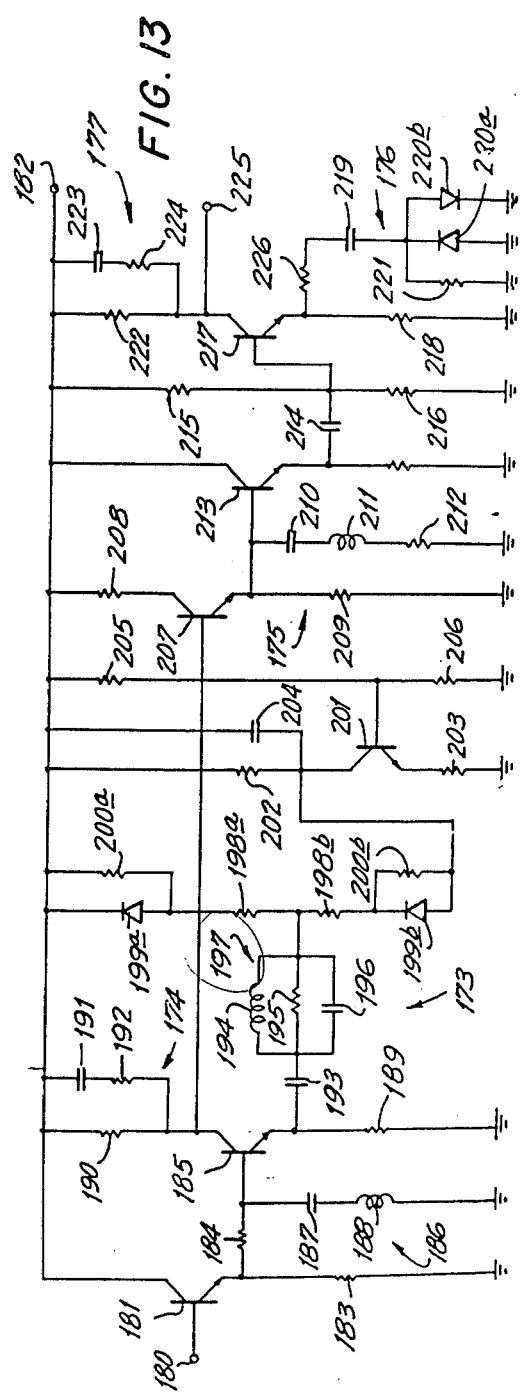

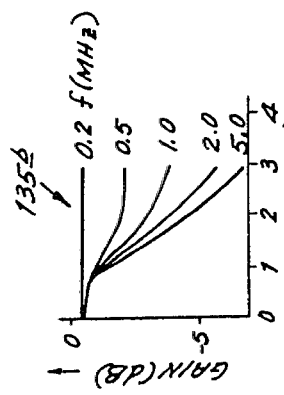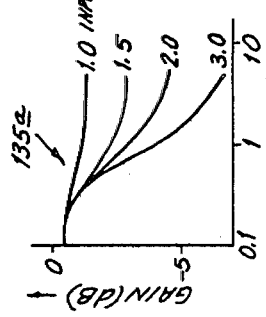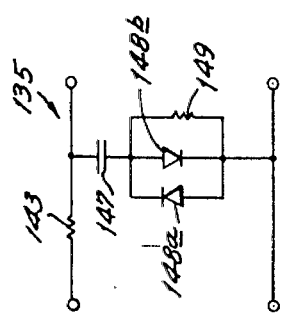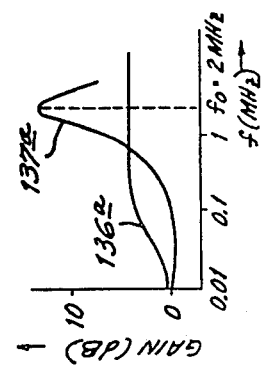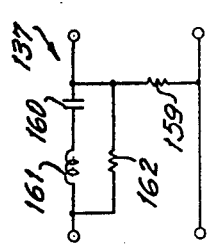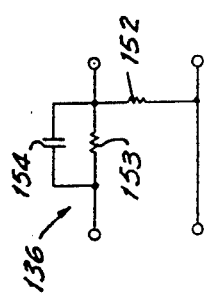

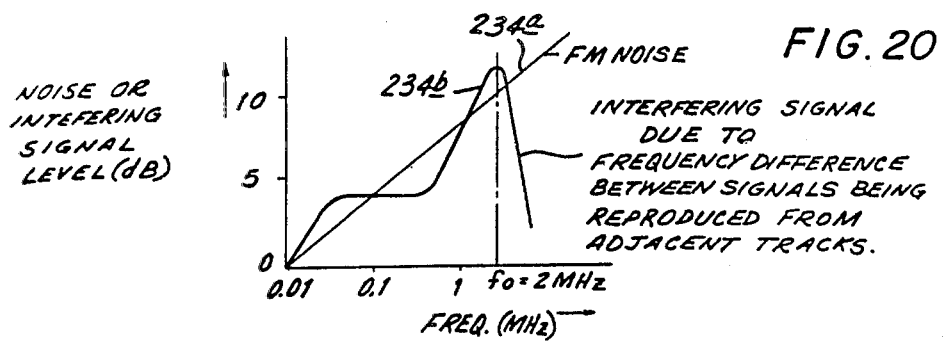
FIG. 21A
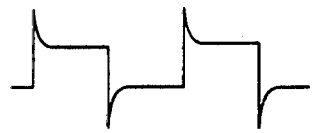
FIG. 21B
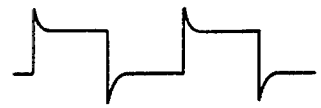
FIG. 21C
FIG. 21D
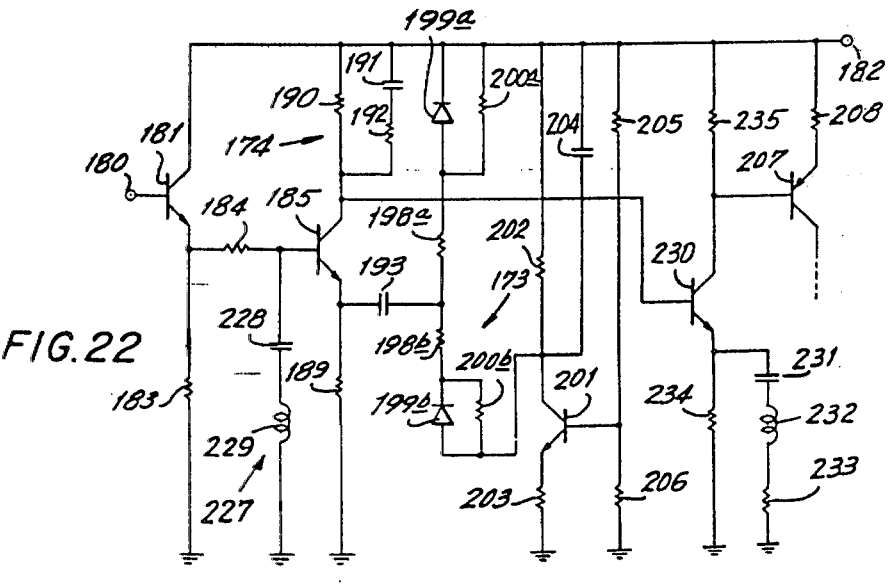
FIG. 22

NOISE AND CROSS-TALK ELIMINATION IN RECORDING AND REPRODUCING VIDEO SIGNALS

This is a continuation of application Ser. No. 812,329 filed July 1, 1977, now abandoned.

BACKGROUND OF THE INVENTION

1. Field of the Invention

This invention relates generally to the recording and reproducing or other transmission of information signals, such as, video signals, and more particularly is directed to the processing of such video or other information signals so as to eliminate or at least reduce interfering or noise signals resulting from the recording and reproducing or other transmission thereof.

2. Description of the Prior Art

It is well known to record video signals on a magnetic tape or other record medium by scanning successive parallel tracks on the record medium with one or more transducers energized by the video signals. In effecting such recording of video signals, it has been the usual practice to provide guard bands or unrecorded gaps between the successive parallel tracks so that, when a transducer scans one of the tracks for reproducing the signals recorded therein, such transducer will not also reproduce cross-talk, that is, signals recorded in the adjacent tracks. However, the provision of guard bands between the successive parallel tracks reduces the recording density, that is, the amount of signal information recorded on a unit area of the record medium, and thus does not permit the efficient utilization of the record medium for the recording of video signals.

One effort made to minimize cross-talk while permitting an increase in the recording density has been to use two transducers having air gaps with different azimuth angles for recording and reproducing signals in the next adjacent or alternate tracks, respectively. This is relatively easy to do because apparatus for magnetically recording and/or reproducing video signals usually includes a rotary guide drum provided with two alternately operative transducers or heads which can have air gaps with different azimuth angles. The tape is wrapped helically about a portion of the perimeter of the drum and is moved longitudinally while the transducers or heads are rotated, thus causing the heads alternately to scan respective tracks for recording or reproducing signals therein. Each transducer or head, in the recording operation of the apparatus, effects magnetization of magnetic domains in the magnetic coating on the tape in what would appear to be, if such domains were visible, a series of parallel lines or stripes each having a length as great as the width of the track, and each having an orientation that corresponds to the azimuth angle of the gap of the respective transducer or head. In the reproducing or playback operation of the apparatus, each track is scanned by the transducer or head having its gap aligned with the parallel, but fictitious, lines of that track, from which it follows that the gap of the transducer or head scanning a track for reproducing the video signals recorded therein extends at an angle to the mentioned fictitious lines of the tracks next adjacent to the track being scanned. By reason of the foregoing, if a transducer or head, in scanning a track for reproducing the video signals recorded therein, overlaps an adjacent track or otherwise reproduces signals recorded in the latter, the well-known azimuth loss would result in attenuation of the signals reproduced from the adjacent track.

It is also well known that, in recording video signals as described above, it is advantageous to record at least a portion of the video signals as a frequency modulation on a carrier having a relatively high frequency. Since the previously mentioned azimuth loss is generally proportional to the frequency of the signals, such azimuth loss is relatively effective to decrease or eliminate the cross-talk from adjacent tracks in respect to the frequency modulated portion of the video signals recorded in the tracks. Thus, insofar as the frequency modulated portion of the recorded video signals is concerned, it is possible to record the video signals in abutting or even partially overlapping successive parallel tracks, that is, without providing guard bands between the adjacent tracks on the record medium.

Although the elimination of the guard bands substantially increases the recording density, any further increase in the recording density, and hence in the amount of video signal information or playing time that can be accommodated on a given length of the magnetic tape, can be achieved only by reducing the width of the successive parallel tracks. However, the degree of azimuth loss is inversely proportional to the width of the tracks. Therefore, if the width of the tracks is reduced to less than a predetermined value, the interference due to cross-talk between video signals reproduced from adjacent tracks is not eliminated or sufficiently minimized by the use of transducers or heads having different azimuth angles. It will be apparent that, if the magnitude of the cross-talk signals being reproduced by a transducer or head from tracks adjacent the track being scanned thereby is not sufficiently small in relation to the magnitude of the video signals reproduced by the head from the scanned track, an interference or beat signal with a frequency different from that of the video signals reproduced from the scanned track and the cross-talk signals will appear as a beat or moire pattern on the image or picture displayed by the cathode ray tube.

Further, it is the usual practice to record video signals with so-called H-alignment so as to avoid interference or cross-talk from the horizontal synchronizing and blanking signals included in the video signals recorded in the successive parallel tracks. In recording video signals with H-alignment, the ends of the margins between the successive areas in which line intervals are recorded in each track are aligned, in the direction transverse to the lengths of the tracks, with the adjacent ends of the margins between the successive areas in which line intervals are recorded in the next adjacent tracks. However, it is not possible to provide an apparatus in which the video signals are recorded with H-alignment when the tape is advanced at two or more different speeds. For example, if the video signals are recorded with H-alignment when the tape is longitudinally driven or transported at a predetermined speed, the signals will not be recorded with H-alignment when the tape is transported at one-half such predetermined speed. In that case, the level of the interfering or noise signal due to cross-talk will become high, for example, when a head or transducer, in reproducing picture information from a track being scanned, simultaneously reproduces a horizontal synchronizing signal as cross-talk from an adjacent track, so that there is a relatively great frequency difference between the cross-talk and the video signal picture information being reproduced from the scanned track. Thus, once again, a beat or moire pattern will appear on the image or picture displayed by the cathode ray tube.

When recording color video signals which include a luminance component and a chrominance component, it is known to separate such components and then to frequency modulate the luminance component on a carrier having a relatively high frequency, while the chrominance component is frequency converted so as to have its frequency band shifted below the frequency band of the frequency modulated luminance component, whereupon the frequency modulated luminance component and the frequency converted chrominance component are combined to provide composite video signals which are recorded in the successive parallel tracks. However, since the azimuth loss is generally proportional to the frequency of the signals, as previously mentioned, interference due to cross-talk from the low frequency or frequency converted chrominance component is not reduced to the same degree by the use of transducers having different azimuth angles as cross-talk from the high frequency or frequency modulated luminance component. Thus, when recording color video signals, it has been proposed, for example, as disclosed in detail in U.S. Pat. No. 4,007,482 and No. 4,007,484, issued Feb. 8, 1977, and each having a common assignee herewith, to reduce or eliminate interference due to cross-talk between low frequency signals recorded in adjacent tracks by recording the chrominance component with different first and second carriers in such adjacent tracks, respectively. The first and second carriers modulated by the chrominance component for recording in adjacent tracks, respectively, may be distinguished from each other by their respective polarity characteristics so that, when a head scans a particular track for reproducing the video signals recorded therein, the chrominance component of cross-talk signals from the tracks next adjacent to the scanned track can be conveniently suppressed or eliminated by reason of the different polarity characteristics of the carriers with which the chrominance component was recorded in the scanned track and in the tracks adjacent thereto, respectively. Although the foregoing scheme effectively eliminates interference due to cross-talk in respect to the chrominance component while permitting a high recording density to be achieved by eliminating guard bands between the tracks and reducing the width of the latter, the previously mentioned limitations on the reduction of the width of the tracks still apply in respect to the frequency modulated luminance component of the recorded color video signals in that, as to such frequency modulated luminance component, the elimination of interference or cross-talk still depends upon the use of transducers or heads having different azimuth angles for recording the video signals in the next adjacent tracks.

Moreover, in the recording operation of existing apparatus for recording and reproducing video signals, at least a high frequency portion of the video signals, that is, the luminance component, is pre-emphasized in a pre-emphasis circuit prior to the frequency modulation thereof, and, in the reproducing or playback operation of such apparatus, the reproduced frequency modulated luminance component is demodulated and then de-emphasized in a de-emphasis circuit which has a characteristic complementary to that of the pre-emphasis circuit for reducing the so-called FM noise signal from the demodulated luminance component. However, the level of the FM noise signal increases with the frequency of the carrier of the frequency modulated luminance component so that, if a high carrier frequency is employed, as previously mentioned, the FM noise signal has a correspondingly high level. Further, the previously mentioned interfering signal due to cross-talk cannot be removed or eliminated by the usual pre-emphasis and de-emphasis circuits because the level of the interfering signal is larger than that of the ordinary FM noise signal and its frequency characteristic is different therefrom. If the amount of emphasis provided by the pre-emphasis circuit is merely increased for the purpose of eliminating the high level FM noise signal and minimizing the interfering signal due to cross-talk upon a corresponding or complementary de-emphasis, relatively large overshoots are produced at those portions of the video signal where the level of the latter is abruptly changed. If the emphasized video signal with such large overshoots is employed as the modulating signal for the frequency modulation, the frequency shifts corresponding to such large overshoots are too great to be included in the transmission band of the apparatus, that is, the band of frequencies that can be magnetically recorded and reproduced, so that the recording and reproducing of the video signal cannot be effected with a linear characteristic. In order to bring the frequency modulated video signal, as recorded and reproduced, within the transmission band, the existing recording and reproducing apparatus is provided with a white and dark clip circuit which limits the pre-emphasized video signal at predetermined high and low levels and thus clips some of the overshoots. In the case of such limiting of the pre-emphasized video signal, however, even if the video signal is processed in a de-emphasis circuit after demodulation during the reproducing operation, it is not possible to obtain precisely the original video signal owing to the distortion of waveforms at the limited or clipped overshoot portions.

OBJECTS AND SUMMARY OF THE INVENTION

Accordingly, it is an object of this invention to provide circuits for the processing of video or other information signals in connection with the recording and reproducing thereof so as to eliminate or substantially minimize interference due to cross-talk and permit the reproduction of the original signals with high fidelity even when the signals are recorded on the record medium with a high recording density.

More particularly, it is an object of this invention to provide an apparatus with signal processing circuits for recording and/or reproducing video signals in successive parallel tracks with a high recording density achieved by elimination of guard bands between the tracks and reduction of the width of the latter while eliminating or at least substantially minimizing an interfering signal due to cross-talk when reproducing the video signals recorded in such tracks.

Another object is to provide an apparatus, as aforesaid, in which a high frequency portion of the video signals, that is, the luminance component thereof, is frequency modulated for the recording thereof, and in which the signal processing circuits are operative to eliminate the usual FM noise signal as well as the interfering signal due to cross-talk.

A further object is to provide an apparatus, as aforesaid, in which the signal processing circuits are operative to eliminate or at least substantially minimize the interfering signals due to cross-talk even when the signals are recorded in successive parallel tracks on a record medium with a high recording density, for example, by the elimination of guard bands between the record tracks and the reduction of the width of the latter, and there is an absence of H-alignment between the signals recorded in adjacent tracks.

Still another object is to provide an apparatus, as aforesaid, for recording and reproducing color video signals in successive parallel tracks on a magnetic tape with a high recording density, in which the luminance component is recorded as a frequency modulation of a carrier having a relatively high frequency while the chrominance component is frequency converted to a band below that of the frequency modulated luminance component, and in which the processing circuits are operative to substantially eliminate from the demodulated luminance component of the reproduced signals the FM noise signal characteristic of the relatively high carrier frequency of the frequency modulated luminance component and the interfering signal due to cross-talk while reproducing the original video signals with high fidelity even when the signals recorded in adjacent tracks are out of H-alignment.

In accordance with an aspect of this invention, in recording video or other information signals at least a high frequency portion thereof, for example, the luminance component of color video signals, is subjected to non-linear pre-emphasis the amount of which is dependent on at least the level and frequency of the luminance component prior to the frequency modulation thereof, and, upon reproducing the signals, after demodulation of the reproduced luminance component, the same is subjected to a non-linear de-emphasis having a characteristic substantially complementary to that of the non-linear pre-emphasis and also being dependent on the level and frequency of the demodulated luminance component for eliminating therefrom the FM noise signal and reducing the interfering signal due to cross-talk.

Further, in accordance with this invention, the elimination of the interfering signal due to cross-talk is enhanced by combining with the above-mentioned non-linear pre-emphasis dependent on the level and frequency of the luminance component an additional non-linear pre-emphasis the amount of which is dependent on the level-frequency characteristics of the interfering signal due to cross-talk, and by similarly combining with the above-mentioned non-linear de-emphasis of the demodulated luminance component an additional non-linear de-emphasis having a characteristic approximately complementary to that of the additional non-linear pre-emphasis.

The above, and other objects, features and advantages of this invention, will be apparent in the following detailed description of illustrative embodiments thereof which is to be read in connection with the accompanying drawings.

BRIEF DESCRIPTION OF THE DRAWINGS

FIGS. 3A and 3B are schematic views illustrating the arrangement of the air gaps of heads or transducers employed for recording and reproducing video signals which are processed by the recording and reproducing circuits of FIGS. 1 and 2;

FIGS. 4A and 4B are schematic views of portions of a magnetic tape respectively showing successive parallel tracks in which video signals are recorded and reproduced by the circuits of FIGS. 1 and 2 when the magnetic tape is advanced at a relatively high or normal speed, and at a relatively slow speed for increasing the recording density and thereby increasing the playing time of the tape;

FIG. 5 is a graph showing the input-output level characteristic of a limiter forming part of a non-linear pre-emphasis circuit included in the recording circuit of FIG. 1;

FIG. 6 is a graph showing the gain-frequency characteristic of the non-linear pre-emphasis circuit of FIG. 1 for various input signal levels;

FIGS. 7A and 7B are schematic illustrations of a video signal, and of the video signal following pre-emphasis thereof, respectively;

FIG. 8 is a graphic representation of the frequency modulating characteristics of a frequency modulator included in the circuit of FIG. 1, and which has its carrier frequency shifted for successive vertical intervals of the modulating video signal;

FIG. 9 shows a rectangular waveform by which the shifting of the carrier frequency of the frequency modulator is controlled;

FIG. 10 is a block diagram illustrating the recording circuit of an apparatus according to another embodiment of this invention and which includes a preferred arrangement of non-linear pre-emphasis circuits;

FIG. 11 is a diagrammatic view showing circuits that may be employed to constitute the arrangement of non-linear pre-emphasis circuits of FIG. 10;

FIG. 12 is a block diagram illustrating the reproducing circuit for reproducing video signals recorded by the circuit of FIG. 10, and which includes a preferred arrangement of non-linear de-emphasis circuits;

FIG. 13 is a diagrammatic view showing details of circuits that may be employed to constitute the arrangement of non-linear de-emphasis circuits of FIG. 12;

FIGS. 14A, 15A and 16A schematically illustrate electrical equivalents of portions of the circuit appearing on FIG. 11, and FIGS. 14B and 14C, FIG. 15B and FIGS. 16B and 16C are graphic illustrations of the respective characteristics;

FIGS. 17 and 18 illustrate the electrical equivalents of additional portions of the circuit shown on FIG. 11, and FIG. 19 graphically illustrates the characteristics of such portions of the circuit;

FIG. 20 graphically illustrates the characteristics of the FM noise signal and the interfering signal due to crosstalk which are substantially eliminated by the recording and reproducing circuits of FIGS. 10 and 12;

FIGS. 21A-21D are waveform diagrams to which reference will be made in explaining a feature of the apparatus according to this invention illustrated on FIGS. 10 and 12;

FIG. 22 is a diagrammatic view illustrating a modification of the circuit arrangement shown on FIG. 13.

DESCRIPTION OF THE PREFERRED EMBODIMENTS

Figure 1:
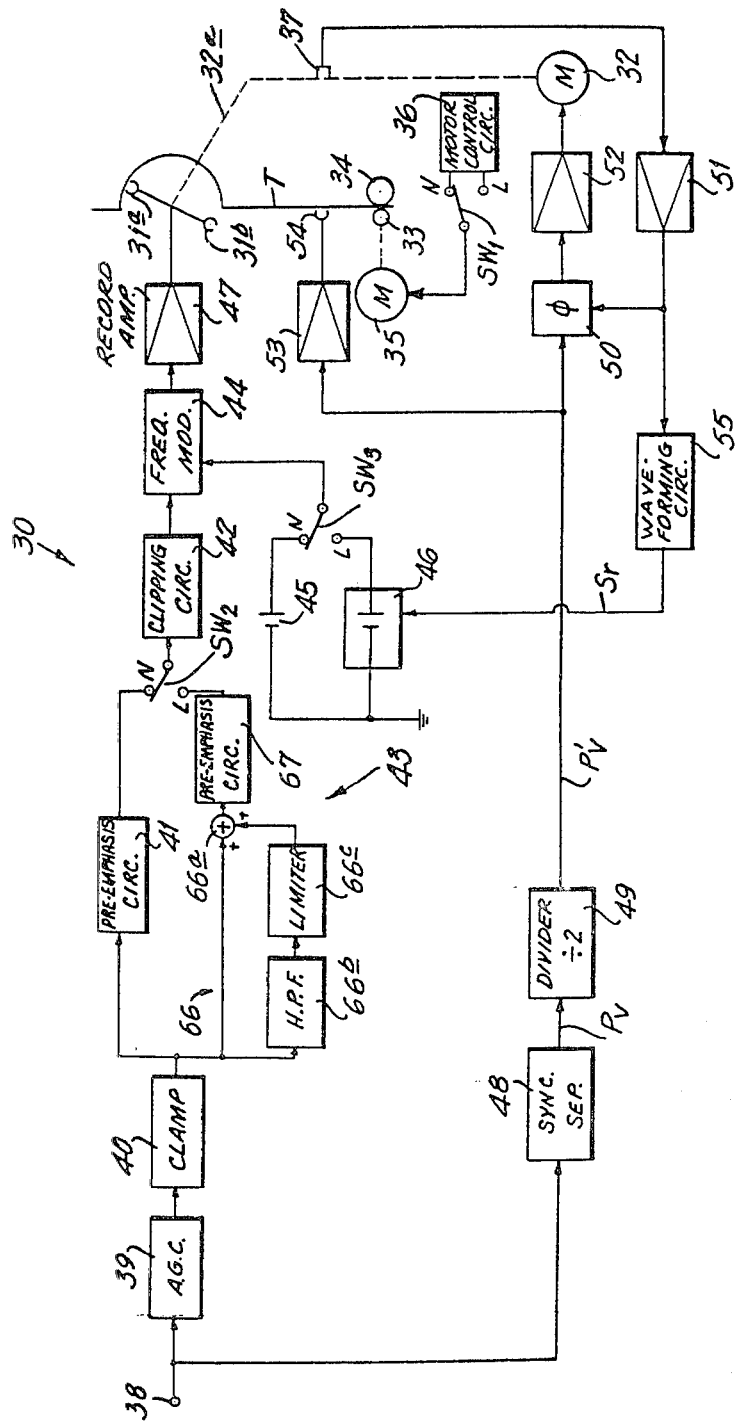
FIG. 1 is a block diagram showing a circuit for recording video signals in an apparatus according to an embodiment of this invention.
Figure 2:
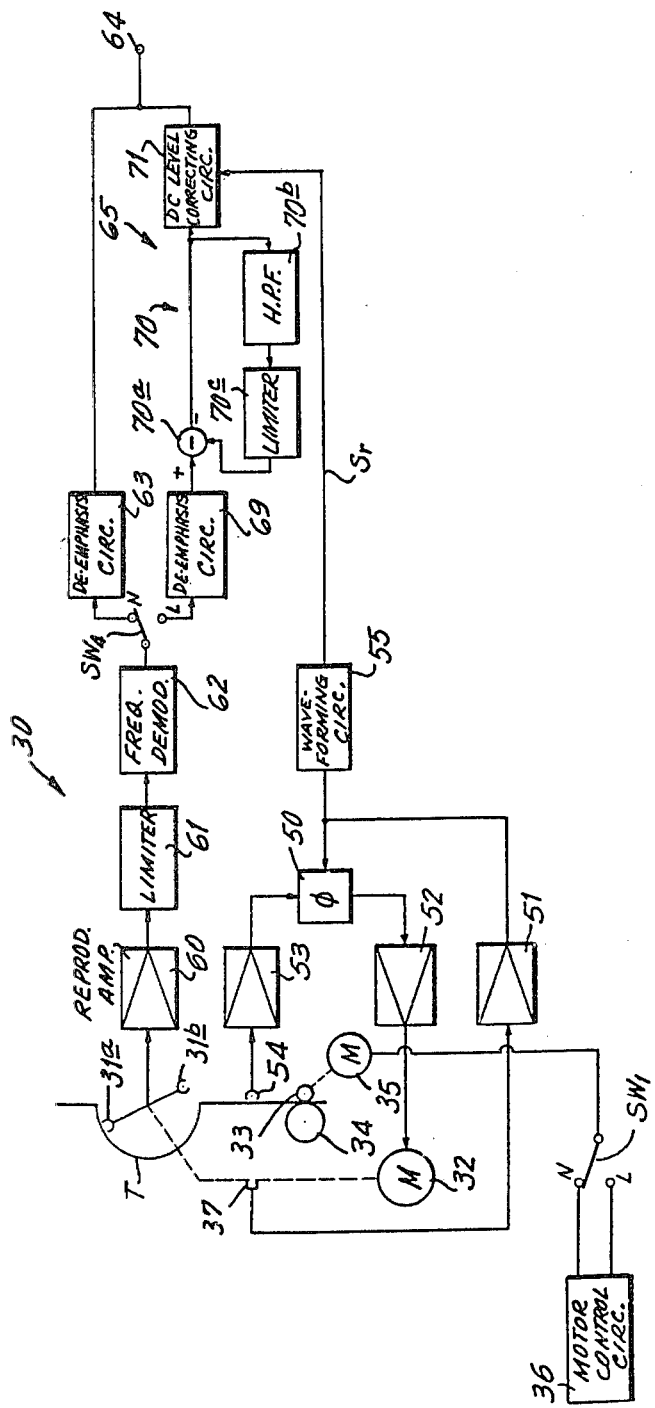
FIG. 2 is a block diagram of a circuit according to this invention for reproducing video signals which have been recorded by the circuit of FIG. 1.

Referring to the drawings in detail, and initially to FIGS. 1 and 2 thereof, it will be seen that the invention is there shown applied to a magnetic tape video signal recording and reproducing apparatus 30 of the helical scan type having a pair of diametrically opposed, rotary magnetic heads 31a and 31b rotated at the rate of 30 revolutions per second by means of a motor 32. A magnetic tape T is wrapped helically about a portion of the periphery of a guide drum (not shown) associated with heads 31a and 31b, and is driven longitudinally at a selected one of two different tape speeds by the cooperative action of a rotated capstan 33 and a pinch roller 34. A motor 35 for driving capstan 33 has its speed of operation regulated by a suitable motor control circuit 36 through a switch $S_1$. Thus, when switch $S_1$ is in the illustrated position engaging its contact N, the motor control signal thus applied from motor control circuit 36 to motor 35 causes the latter to drive capstan 33 at a rotational speed corresponding to a normal tape speed. On the other hand, when switch $S_1$ is changed-over to engage its contact L, the motor control signal thus applied from circuit 36 to motor 35 causes the latter to rotate capstan 33 at a reduced speed for driving the tape at a relatively slow speed for long playing operation of the recording and reproducing apparatus. The two different tape speeds obtained when switch $S_1$ engages its N and L contacts, respectively, are selected so that, for example, if video signals can be recorded on a predetermined length of tape T for one hour when the tape is driven at the normal speed, video signals can be recorded on such predetermined length of tape for two hours when the slow or long-playing tape speed is selected. Furthermore, in the apparatus illustrated on FIGS. 1 and 2, a rotation indicating pulse generator 37 is provided, for example, in association with the shaft 32a connecting motor 32 with heads 31a and 31b, for producing a rotation indicating pulse for each revolution of the heads, with such pulse being in a predetermined phase relation to the rotational position of heads 31a and 31b.

Figure 15B:
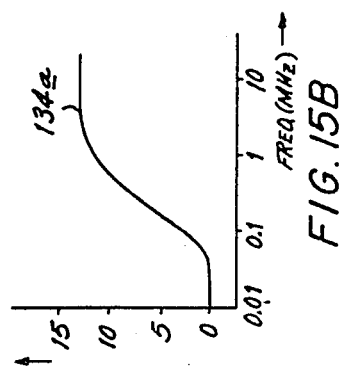

As shown particularly on FIG. 1, the recording circuit of apparatus 30 includes additional switches $SW_2$ and $SW_3$ which may be ganged with switch $SW_1$ so that switches $SW_2$ and $SW_3$ engage their respective contacts N, as shown, when the normal tape speed is selected, and further so that switches $SW_2$ and $SW_3$ are changed-over to engage their respective contacts L when the slow or long-playing tape speed is selected. In the recording operation of apparatus 30, black-and-white video signals, or the high frequency portion or luminance component of color video signals, are applied to an input terminal 38, and from the latter through an automatic gain control circuit 39 to a clamp circuit 40 in which the sync-tip level of the video signals is made constant or clamped. During recording operations at the normal tape speed, the clamped video signals are applied through a conventional pre-emphasis circuit 41 and contact N of switch $SW_2$ to a conventional clipping circuit 42. The pre-emphasis circuit 41 provides a so-called linear pre-emphasis in that, for example, as shown on FIG. 15B, the gain-frequency characteristic thereof is independent of the level of the video signals. Thus, circuit 41 will provide the same amount of emphasis to a high level-high frequency video signal as it does to a low level-high frequency video signal.

On the other hand, in accordance with this invention, during a recording operation with tape T being driven at the relatively slow or long-playing speed, the clamped video signals from circuit 40 are supplied through a signal processing circuit 43, which will be hereinafter described in detail, and through contact L of switch $SW_2$ to clipping circuit 42. In either recording mode of apparatus 30, that is, when recording with either the normal tape speed or the long-playing tape speed, the pre-emphasized video signals, after being clipped in circuit 42, are applied to a frequency modulator 44 for frequency modulating a carrier of relatively high frequency in the latter. During recording at the normal tape speed, frequency modulator 44 is continuously supplied with a predetermined constant DC voltage from a DC voltage source 45 through contact N of switch $SW_3$ so as to provide the carrier which is to be frequency modulated with a frequency determined by the value of the voltage from source 45. On the other hand, during recording with the slow or long playing tape speed, frequency modulator 44 is supplied with a variable DC voltage from a variable DC voltage source 46 through contact L of switch $SW_3$, and variable DC voltage source 46 is controlled so that the level of the DC voltage applied therefrom to frequency modulator 44 will change for successive field intervals of the video signals being recorded. More particularly, and as disclosed in detail in my U.S. Pat. No. 4,165,518, granted Aug. 21, 1979, and having a common assignee herewith, the levels of the variable DC voltages applied from source 46 to frequency modulator 44 for successive field intervals are selected so that the corresponding carrier frequencies subject to frequency modulation in modulator 44 during the successive field intervals will differ from each other by $(m+\frac{1}{2})f_H$, for example, by $\frac{1}{2}f_H$, in which $f_H$ is the horizontal or line frequency of the video signals being recorded. The frequency modulated signal from modulator 44 is applied through a recording amplifier 47 to heads 31a and 31b which, in the illustrated apparatus 30 are intended to alternately record successive field intervals of the video signals. In order to synchronize the rotation of heads 31a and 31b with the field intervals of the video signals applied to input terminal 38 so that each of the rotary heads will record a field interval as it scans a record track extending obliquely across tape T, a sync separating circuit 48 is connected to input terminal 38 for separating vertical synchronizing signals $P_v$ from the video signals applied to terminal 38. The separated vertical synchronizing signals $P_v$, which occur at the frequency of the field intervals, are applied to a frequency dividing circuit 49 which divides by two so as to provide a synchronizing pulse $P'_v$ at the frequency of the frame intervals. The synchronizing pulse $P'_v$ is applied to a phase comparator 50, and the rotation indicating pulses from generator 37 are applied through a pulse-forming circuit 51 to phase comparator 50 which, on the basis of phase deviation between the pulses received from frequency divider 49 and pulse-forming amplifier 51, suitably varies its output or control voltage applied to a servo amplifier 52 for controlling motor 32. Thus, the rotation of heads 31a and 31b is controlled so that each head will commence its scanning obliquely across tape T at the commencement of a field interval of the video signals being recorded. The synchronizing pulse $P'_v$ is further shown to be applied through an amplifier 53 to a fixed magnetic head 54 which, in the recording operation of apparatus 30, is effective to record the synchronizing pulses $P'_v$ as track identifying control signals CTL (FIGS. 4A and 4B) at suitably spaced apart locations along a longitudinal edge of tape T.

In the recording circuit of FIG. 1, the pulses from pulse-forming circuit 51 are further shown to be applied to a waveforming circuit 55 for producing a control signal $S_r$ (FIG. 9) of rectangular waveform which is, in turn, applied to variable DC voltage source 46 for controlling the level of the voltage output therefrom. As shown, rectangular control signal $S_r$ has a period equal to the frame interval of the video signals being recorded so that, during the alternate field intervals indicated at $I_1$ on FIG. 9, a relatively high control voltage is applied to voltage source 46, whereas, during the intervening or remaining field intervals indicated at $I_2$, a relatively low control voltage is applied to voltage source 46. Thus, during successive field intervals $I_1$ and $I_2$ of video signals being recorded with the slow or long-playing tape speed, variable DC voltage source 46 applies correspondingly high and low voltage levels to frequency modulator 44 for similarly changing the frequency of the carrier which is frequency modulated in modulator 44. Accordingly, as shown on FIG. 8 during the recording of each of the alternate field intervals $I_1$, the frequency modulation of the carrier in response to the clipped video signals applied to modulator 44 from circuit 42 may occur along the line or curve 56a, whereas, during the recording of each of the intervening field intervals $I_2$, the frequency modulation may occur along the line or curve 56b which deviates by $\frac{1}{2}f_H$ from line 56a.

As is shown on FIG. 4A, during recording operation of apparatus 30 with the normal tape speed, heads 30a and 30b are alternately operative to record respective field intervals of the frequency-modulated video signals in respective parallel record tracks $T_A$ and $T_B$ which are alternately arranged with a predetermined track pitch so as to provide guard bands of constant width between the adjacent tracks $T_A$ and $T_B$. On the other hand, as shown on FIG. 4B, when recording with the slow or long-playing tape speed, which is, for example, one-half the normal tape speed, the track pitch is correspondingly reduced so that the successively scanned tracks overlap each other. Thus, for example, as head 30b scans a record track $T_B$ on tape T, such track overlaps the track $T_A$ previously scanned by the head 30a, as shown on FIG. 4B, with the result that the effective widths of the successive tracks $T_A$ and $T_B$ are substantially reduced and the guard bands therebetween are eliminated for providing a high recording density.

As previously mentioned, each of the tracks $T_A$ and $T_B$ preferably has recorded therein the signal information corresponding to a respective field interval of the video signals, and each track is divided into successive areas or increments each having recorded therein the signal information corresponding to a horizontal or line interval of the respective field of the video signals. Each line interval and each field interval of the video signals contains a blanking and synchronizing portion and, in accordance with accepted practice, the relative movements of the heads and the tape, as indicated by the arrows 57 and 58 on FIG. 4A, are preferably regulated in accordance with the synchronizing signals of the video signals to be recorded so as to obtain so-called H-alignment of the areas in which line intervals are recorded in each track with the areas in which line intervals are recorded in the next adjacent tracks during recording with the normal tape speed. In other words, as shown schematically on FIG. 4A, when recording at the normal tape speed, the ends of the margins between the areas in which the line intervals are recorded in each of the tracks $T_A$ are aligned, in the direction transverse to the lengths of the tracks, with the adjacent ends of such margins in the next adjacent tracks $T_B$.

Further, as shown schematically on FIGS. 3A and 3B, heads 31a and 31b have air gaps 59a and 59b, respectively, arranged at substantially different azimuth angles $\theta_a$ and $\theta_b$ in respect to the plane of rotation of the heads. By reason of the foregoing, each of the heads 31a and 31b, when recording video signals in the respective tracks on tape T, effects magnetization of magnetic domains in the magnetic coating on the tape in what would appear to be, if such domains were visible, a series of parallel lines or stripes extending across the respective track and each having an orientation that corresponds to the azimuth angle $\theta_a$ or $\theta_b$ of the gap of the respective head 31a or 31b.

Referring now to FIG. 2, it will be seen that a number of the elements described above in connection with the recording operation of apparatus 30 are also employed in connection with the reproducing operation of such apparatus and are identified by the same reference numerals on FIG. 2. Thus, during the reproducing operation, either the normal tape speed or the relatively slow or long-playing tape speed is determined by the position of switch SW$_1$ which applies to motor 35 driving capstan 33 one or the other of the suitable motor control signals from circuit 36. During reproducing operation, fixed magnetic head 54 reproduces the successive track indicating signals CTL recorded along a longitudinal edge of tape T and applies the same to the pulse-forming amplifier 53 which provides suitably shaped pulses to phase comparator 50. Simultaneously, rotation indicating pulses from generator 37 are applied through pulse-forming circuit 51 to another input of phase comparator 50 which, on the basis of a phase comparison of the pulses from circuits 51 and 53, applies a corresponding control voltage to servo amplifier 52 for controlling the rotation of motor 32 driving rotary heads 31a and 31b. Thus, the rotation of heads 31a and 31b is suitably controlled so that, during a reproducing operation with the tape moving at the same speed employed for a previous recording operation, tracks $T_A$ and $T_B$ will be accurately scanned by the same heads 31a and 31b, respectively, that were previously employed for recording frequency modulated video signals in such tracks.

The reproducing circuit of apparatus 30 is shown to include a reproducing amplifier 60 and a limiter 61 through which the frequency modulated video signals alternately reproduced by heads 31a and 31b from successive tracks $T_A$ and $T_B$ are successively applied to a frequency demodulator 62. The demodulated output of frequency demodulator 62 is applied to a switch SW$_4$ which may be ganged with switch SW$_1$ so as to engage its contact N, as shown, during normal reproducing, that is, during reproducing of video signals with the tape being driven at the normal speed at which such video signals were originally recorded. Thus, during normal reproducing, the demodulated output from frequency demodulator 62 is supplied, by way of switch SW$_4$ and a conventional de-emphasis circuit 63 to an output terminal 64. The de-emphasis circuit 63 provides a so-called linear de-emphasis with a characteristic substantially complementary to that of the pre-emphasis circuit 41 of the recording circuit, and may be of the type used in existing video tape recorders. In referring to the emphasis circuit 63 as a linear de-emphasis circuit, it is meant that the amount of de-emphasis provided thereby is dependent only upon the frequency of the demodulated signal and is not varied in accordance with the level of the latter.

On the other hand, if video signals have been recorded on a tape T while the tape is moved at the slow or long-playing speed, reproducing of such signals is also effected at the slow or long-playing tape speed and, in that case, switch $SW_4$ is changed-over to engage its L contact so that the demodulated video signals from demodulator 62 are then applied to output terminal 64 through a signal processing circuit 65 according to this invention which is hereinafter described in detail.

As is apparent from FIG. 4A, during the reproducing at the normal tape speed of signals recorded at such normal tape speed, the tracks $T_A$ and $T_B$ scanned by heads 31a and 31b, respectively, are of the same width as the heads so that each of the heads can be made to scan only the respective track during reproducing. By reason of the foregoing, and further by reason of the guard bands between the adjacent tracks and the different azimuth angles of the gaps 59a and 59b of heads 31a and 31b, the level of any cross-talk signals is reduced to a great extent so that interfering signals due to cross-talk are not a problem. On the other hand, as is apparent from FIG. 4B, when recording with the slow or long-playing tape speed, the effective width of each of the tracks $T_A$ and $T_B$ that remain on tape T at the completion of the recording operation is substantially less than the width of each of the heads 31a and 31b. Therefore, when reproducing with the slow or long-playing tape speed, each of the heads 31a and 31b, when scanning and reproducing the signals recorded in a track $T_A$ or $t_B$, respectively, will also scan a portion of the width of an adjacent track $T_B$ or $T_A$, ,espectively, so as to also reproduce the signals recorded in the latter as a cross-talk signal. Therefore, the level of the cross-talk signal, in the case of reproducing with the slow or long-playing tape speed, is substantially increased relative to the level of the cross-talk signal in the case of reproducing with the normal tape speed. Furthermore, by reason of the reduced width of the tracks $T_A$ and $T_B$ when recording with the slow or long-playing tape speed, the different azimuth angles of the air gaps of heads 31a and 31b are of reduced effectiveness in attenuating or decreasing the level of the cross-talk signal during reproducing with the slow or long-playing tape speed. Therefore, when reproducing with the slow or long-playing tape speed, the cross-talk signal can give rise to a disturbing interfering signal insofar as there is a substantial difference in frequency between the cross-talk signal and the signal being simultaneously reproduced from the track which is actually being scanned.

Furthermore, if the signals are recorded with H-alignment between signals recorded in adjacent tracks during recording with the normal tape speed, as shown on FIG. 4A, H-alignment cannot be obtained when recording with the slow or long-playing tape speed, as shown on FIG. 4B. By reason of the absence of H-alignment of the signals recorded with the slow or long-playing tape speed, relatively large frequency differences occur between the signal being reproduced from a track being scanned and the cross-talk signal from an adjacent track when reproducing with the long-playing tape speed. By reason of such relatively large frequency differences, the resulting relatively high level interfering signals cannot be sufficiently eliminated by the azimuth loss resulting from the different azimuth angles of the air gaps of heads 31a and 31b.

It will be understood that, in the case of recording and reproducing video signals with the normal tape speed, pre-emphasis circuit 41 and de-emphasis circuit 63 are intended to cooperate for reducing the FM noise signal from the reproduced video signals obtained at output terminal 64 of the reproducing circuit. However, the interfering signal due to cross-talk that is obtained when reproducing with the slow or long-playing tape speed, as described above, cannot be removed or eliminated by the cooperative action of pre-emphasis circuit 41 and de-emphasis circuit 63 as the level of such interfering signal is larger than the level of the ordinary FM noise signal and the frequency characteristic of the interfering signal is different from that of the FM noise signal. If the amount of emphasis provided by pre-emphasis circuit 41 and the corresponding amount of de-emphasis provided by de-emphasis circuit 63 are increased with a view to minimizing the interfering signal due to cross-talk appearing at output terminal 64, the video signals obtained at output terminal 64 will be distorted, that is, will not be high fidelity reproductions of the original video signals applied to input terminal 38. In connection with the foregoing, it will be noted that, by reason of the linear characteristic of pre-emphasis circuit 41 which provides an amount of emphasis independent of the level of the signal, increasing the amount of emphasis would cause great overshoots to occur at portions of the video signals where the level of the latter is abruptly changed between high and low values. Thus, if a video signal $S_1$ (FIG. 7A) is subjected to a large amount of emphasis in circuit 41, the resulting pre-emphasized signal $S_2$ (FIG. 7B) will have large overshoots $S_3$ extending beyond the desired maximum and minimum levels of the video signal. Such large overshoots, if applied directly to frequency modulator 44 would result to frequency shifts extending beyond the transmission band of the recording and reproducing apparatus, with the result that recording and reproducing of the video signals could not be performed with a linear characteristic. In order to avoid the foregoing, the white and dark clipping circuit 42 limits the pre-emphasized video signals at predetermined high and low levels, for example, at levels causing the frequency modulated signal from modulator 44 to have frequencies of 4.8 MHz and 3.5 MHz, respectively. Thus, if the amount of emphasis provided by pre-emphasis circuit 41 is increased in an attempt to minimize the interfering signal due to cross-talk in the output from terminal 64, the resulting increase in the overshoots $S_3$ extending beyond the limited levels causes increasing amounts of such overshoots to be clipped by clipping circuit 42. Therefore, when the demodulated signals are subjected to de-emphasis in circuit 63 of the reproducing circuit, it is not possible to obtain high fidelity reproductions of the original video signals owing to the distortion of waveforms at the previously clipped or limited overshoots.

In order to avoid the foregoing problems, in the apparatus 30 according to this invention, the signal processing circuit 43 through which the clamped video signals are passed during recording with the slow or long-playing tape speed is shown to include a non-linear pre-emphasis circuit identified generally by the reference numeral 66 followed by a linear-emphasis circuit 67 which may have a characteristic similar to that of the pre-emphasis circuit 41, for example, as shown on FIG.

15B. In the embodiment of the present invention illustrated by FIG. 1, the non-linear pre-emphasis circuit 66 is shown to include an adder circuit 66a, a high pass filter 66b and a limiter 66c. The video signals from clamping circuit 40 are fed directly to one input of adder circuit 66a and also to high pass filter 66b which passes only the high-frequency components of the video signals to limiter 66c. The limiter 66c has an input-output characteristic represented by the solid line on FIG. 5, and the output of limiter 66c is supplied to another input of adder circuit 66a. Thus, adder circuit 66a adds the level of the high-frequency components of the video signal obtained from limiter 66c to the level of the video signals with a flat frequency characteristic obtained from clamping circuit 40. Since the high frequency components from limiter 66c have their levels increasingly compressed as the levels of such high frequency components increase by reason of the input-output characteristic of limiter 66c shown on FIG. 5, the response of non-linear pre-emphasis circuit 66 varies in accordance with the level of the video signals obtained from clamping circuit 40, for example, as indicated by curves 68A–68C on FIG. 6. It will be apparent from the foregoing that the video signals obtained at the output of adder circuit 66a will have been non-linearly pre-emphasized by circuit 66, that is, the video signals will have been subjected to an amount of emphasis that is dependent on the level as well as the frequency of the video signals obtained from clamping circuit 40.

The non-linearly pre-emphasized signals from circuit 66 are further pre-emphasized in circuit 67 which, as previously mentioned, may have substantially the same characteristic as pre-emphasis circuit 41.

Referring now to FIG. 2, it will be seen that the processing circuit 65 for processing the demodulated video signals from demodulator 62 during reproducing with the slow or long-playing tape speed may include a linear de-emphasis circuit 69 having a characteristic which is substantially complementary to that of pre-emphasis circuit 67, a non-linear de-emphasis circuit 70 generally identified by the reference numeral 70, and a DC level correcting circuit 71. The DC level correcting circuit 71 is controlled by the control signal $S_r$ (FIG. 9) of rectangular waveform produced by waveforming circuit 55 which is controlled by the pulses generated by pulse forming circuit 51 in response to the rotation indicating pulses from generator 37. More particularly, control signal $S_r$ causes circuit 71 to eliminate from the de-emphasized video signals the DC level variation corresponding to the frequency difference of $\frac{1}{2}f_H$ between the carriers of the frequency modulated video signals as recorded in the successive tracks $T_A$ and $T_B$ during recording with the slow or long-playing tape speed.

In the embodiment illustrated by FIG. 2, the non-linear de-emphasis circuit 70 is shown to include a subtractor circuit 70a receiving, at one of its inputs, the linearly de-emphasized output of circuit 69, a high pass filter 70b receiving the output of subtractor circuit 70a, and a limiter 70c receiving the high frequency components passing through filter 70b and applying its limited output to another input of subtractor 70a. The high pass filter 70b has the same characteristic as the high pass filter 66b, while the limiter 70c has the same characteristic as limiter 66c. By reason of the foregoing, the non-linear de-emphasis circuit 70 has a characteristic substantially complementary to that of the non-linear pre-emphasis circuit 66 so that the linearly de-emphasised output of circuit 69 is further subjected, in circuit 70, to a de-emphasis which varies with the level as well as the frequency of the signals being processed. Thus, the demodulated video signals from demodulator 62, after being de-emphasized by the linear and non-linear de-emphasis circuits 69 and 70, have a flat frequency characteristic.

It will be seen that, in the apparatus 30 in accordance with this invention, as described above, during recording with the slow or long-playing tape speed, the high-amplitude, high-frequency components of the video signals can be emphasized to a relatively small extent, while the low-amplitude, high-frequency components of the video signals are emphasized to a relatively large extent as compared with the amount of pre-emphasis provided during recording with the normal tape speed. Similarly, when reproducing with the slow or long playing tape speed, the high-amplitude, high-frequency components of the reproduced video signals are deemphasized to a relatively small extent, while the low-amplitude, high-frequency components of the reproduced signals are de-emphasized to a relative large extent as compared with the amount of de-emphasis provided during reproducing with the normal tape speed. Therefore, the interfering signal due to cross-talk which has an increased level when reproducing with the slow or long-playing tape speed, which level is nevertheless substantially lower than the level of the high-amplitude components of the video signals, can be substantially eliminated by causing the non-linear emphasis and de-emphasis circuits 66 and 70 to provide suitably large amounts of emphasis and de-emphasis, respectively, for the levels and frequencies characteristic of the interfering signal. Since such increased amount of emphasis is not effective in respect to the high amplitude components of the video signals being recorded, the overshoots resulting therefrom will not be substantially clipped by clipping circuit 42 and, therefore, the emphasized video signals will be frequency modulated without large distortions by reason of clipping circuit 42. By reason of the foregoing, the reproduced video signals obtained at output terminal 64 during reproducing with the slow or long-playing tape speed, are high fidelity reproductions of the original video signals applied to input terminal 38, and further are substantially devoid of the FM noise signal and any interfering signal due to cross-talk.

An apparatus 130 according to another embodiment of this invention will now be described with reference to FIGS. 10 and 12 respectively showing the recording and reproducing circuits of such apparatus 130. In FIGS. 10 and 12, those elements of the recording and reproducing circuits corresponding to elements included in the apparatus 30 described above with reference to FIGS. 1 and 2 are identified by the same reference numerals, and the specific description of such elements will be omitted. Further, it will be noted that, in the apparatus 130, arrangements for controlling the rotation of heads 31a and 31b and the speed of movement of tape T, although not shown on FIGS. 10 and 12, may be similar to the arrangements previously described for such purposes in respect to the apparatus 30.

Referring in detail to FIG. 10, it will be seen that the recording circuit of apparatus 130 is generally similar to the recording circuit shown on FIG. 1 and differs substantially from the latter only in respect to a signal processing circuit 131 which replaces the circuit 43 on FIG. 1, and in respect to a compressing circuit 132 which replaces the clipping circuit 42 on FIG. 1. Similarly, the reproducing circuit shown on FIG. 12 will be seen to differ substantially from the reproducing circuit of FIG. 2 only in respect to a signal processing circuit 133 which replaces the signal processing circuit 65 on FIG. 2. The processing circuit 131 and compressing circuit 132 in the recording circuit, and the processing circuit 133 in the reproducing circuit are provided to permit sufficiently large and selective emphasis and de-emphasis of the signals during recording and reproducing operations with the slow or long-playing tape speed for more completely eliminating the FM noise signal and the interfering signal due to cross-talk from the reproduced video signals obtained at output terminal 64.

As shown on FIG. 10, during recording with the normal tape speed, the clamped video signals from circuit 40 are supplied to compressing circuit 132 through linear pre-emphasis circuit 41 by way of the contact N of switch $SW_2$. On the other hand, during recording with the slow or long-playing tape speed, the change-over of switch $SW_2$ to engage its contact L causes the clamped video signals from circuit 40 to be supplied to compressing circuit 132 by way of the signal processing circuit 131 which is shown to include, in succession, a linear pre-emphasis circuit 134, a non-linear compressing circuit 135 and linear pre-emphasis circuits 136 and 137. As hereinafter described in detail, pre-emphasis circuit 134 and compressing circuit 135 have characteristics which, in combination, cause such circuits to constitute a non-linear pre-emphasis circuit identified generally by the reference numeral 138 and which is particularly suited for dealing with the FM noise signal. Further, pre-emphasis circuits 136 and 137 have characteristics, as hereinafter described in detail, which, when combined with the non-linear characteristic of compressing circuit 132, cause such circuits to constitute a non-linear pre-emphasis circuit generally identified by the reference numeral 139, and which is particularly suited for dealing with the interfering signal due to cross-talk.

A suitable circuit arrangement for constituting the processing circuit 131 and compressing circuit 132 will now be described with reference to FIG. 11 from which the switch $SW_2$ has been omitted for facilitating the description. In the circuit arrangement of FIG. 11, it will be seen that a transistor 140 has its base connected to an input terminal 141 which receives the clamped video signals from clamping circuit 40 on FIG. 10. The collector of transistor 140 is connected to a voltage supply terminal 142 through a resistor 143, while the emitter of transistor 140 is grounded through a resistor 144 and, in parallel with the latter, a series circuit of a capacitor 145 and a resistor 146. It will be noted that resistors 144 and 146 and capacitor 145 form pre-emphasis circuit 134.

The collector of transistor 140 is further shown to be connected to voltage supply terminal 142 through a capacitor 147 and diodes 148a and 148b which are parallel-connected to each other with opposite polarities, and a resistor 149 for discharging capacitor 147 is connected between voltage supply terminal 142 and the connection of capacitor 147 with diodes 148a and 148b. It will be noted that capacitor 147, diodes 148a, 148b and resistor 149 combine to form compressing circuit 135 on FIG. 10.

Figure 15A:
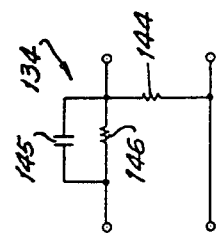

The pre-emphasis circuit 134 constituted by resistors 144 and 146 and capacitor 145 can be equivalently represented by the four-terminal network thereof shown on FIG. 15A, and serves to increase the gain of transistor 140 for high frequency components of the video signals. Thus, for example, pre-emphasis circuit 134 may be provided with a pre-emhasis characteristic 134a shown on FIG. 15B by selecting suitable values for the resistors 144 and 146 and the capacitor 145. The amount of emphasis provided by circuit 134 may be sufficiently large to cause transistor 140 to produce at its collector the video signal $S_2$ with overshoots $S_3$, as shown on FIG. 7B, when the input video signal $S_1$ shown on FIG. 7A is applied to the base of transistor 140.

The compressing circuit 135 which is supplied with the emphasized signal $S_2$ and which is constituted by capacitor 147, diodes 148a,148b and resistor 149 can be equivalently represented by a four-terminal network thereof illustrated on FIG. 16A. As is indicated on FIG. 7A, the level of the video signal $S_2$ is selected so that the level $E_{wd}$ between the white and sync tip levels of video signal $S_2$ is approximately equal to the forward voltage of diodes 148a and 148b. Thus, since both diodes 148a and 148b are non-conductive within the range of level $E_{wd}$, the components of video signal $S_2$ appearing at the collector of transistor 140, and which are within the level $E_{wd}$, are unchanged by compressing circuit 135. However, because capacitor 147 represents a low impedance in respect to overshoots $S_3$, such overshoots $S_3$ extending beyond the level $E_{wd}$ cause diodes 148a and 148b to be turned ON. As a result of the foregoing, the equivalent collector resistance of transistor 140 decreases, so that the gain of transistor 140 will be correspondingly reduced. Consequently, compressing circuit 135 has a compressing characteristic 135a with respect to frequency, as shown on FIG. 16B, when input levels of the video signals are used as parameters, and the compressing characteristic 135b with respect to the input level of the video signals, as shown on FIG. 16C, when frequencies are used as parameters. From the compressing characteristics shown on FIGS. 16B and 16C, it will be apparent that the extent to which compressing circuit 135 compresses the relatively higher frequency components of video signal $S_2$ is much greater when such high frequency components are at a high level than when the high frequency components are at a low level.

Thus, linear pre-emphasis circuit 134 and non-linear compressing circuit 135 combined to form the non-linear pre-emphasis circuit 138, as previously mentioned, which is designed to provide a relatively high amount of emphasis for preventing deterioration of the S/N ratio at the upper range of the frequency band of the frequency modulated video signals when the video signals from processing circuit 131 modulate the carrier in frequency modulator 44.

Continuing with the specific circuit arrangement shown on FIG. 11, it will be seen that the output of compressing circuit 135 is applied to the base of a transistor 150 through a transistor 151 constituting a buffer amplifier. Transistor 150 is shown to be of the PNP-type, as distinguished from all of the other transistors appearing on FIG. 11 which are of the NPN-type. The emitter of transistor 150 is shown to be connected to voltage supply terminal 142 through a resistor 152 and, in parallel with the latter, through a series circuit of a resistor 153 and a capacitor 154. The resistors 152 and 153 and capacitor 154 combine to constitute the pre-emphasis circuit 136 on FIG. 10.

Further, the collector of transistor 150 is shown to be grounded through a resistor 155, and to be also connected to the base of a transistor 156. The collector of transistor 156 is coupled through a resistor 157 to an output terminal 158 for connection to the modulation signal input terminal of frequency modulator 44. The emitter of transistor 156 is shown to be grounded through a resistor 159 across which is connected a series circuit of a capacitor 160, an inductor 161 and a resistor 162. The resistors 159 and 162, capacitor 160 and inductor 161 connected to the emitter of transistor 156, as shown, constitute the pre-emphasis circuit 137 on FIG. 10.

The pre-emphasis circuit 136 can be equivalently represented by the four-terminal network of resistors 152 and 153 and capacitor 154 shown on FIG. 17, and which operates in the same manner as the pre-emphasis circuit 134. However, pre-emphasis circuit 136 is designed to have a pre-emphasis characteristic 136a (FIG. 19) from which it is apparent that the time constant of pre-emphasis circuit 136 is substantially larger than the time constant of pre-emphasis circuit 134, and further that the amount of emphasis provided by circuit 136 is substantially less than the amount of emphasis provided by circuit 134. In other words, the cut-off frequency of pre-emphasis characteristic 136a is relatively low as compared with the cut-off frequency of the pre-emphasis characteristic 134a of circuit 134 so that, for example, frequencies above 50 KHz are emphasized in the pre-emphasis circuit 136. In such low frequency region, the levels of the video signal spectrum are relatively large, so that the amount of emphasis provided therein cannot be excessive.

The pre-emphasis circuit 137 can be represented by the equivalent four-terminal network of resistors 159 and 162, capacitor 160 and inductor 161 shown on FIG. 18, and which are relatively dimensioned to provide a pre-emphasis characteristic 137a (FIG. 19) which affords substantial emphasis only to signal components in the neighborhood of a resonant frequency $f_o$ which, for example, has a value of 2 MHz.

Returning to FIG. 11, it will be noted that the compressing circuit 132 is there shown to be connected to the collector of transistor 156, and to include a transistor 163 provided, at its base, with a base bias voltage determined by dividing the voltage from terminal 142 by means of resistors 164 and 165. The emitter of transistor 163 is grounded through a resistor 166 so that the circuit composed of transistor 163 and resistors 164–166 forms a constant current source. The collector of transistor 163 is shown to be connected to voltage supply terminal 142 through a resistor 167 having a capacitor 168 in parallel therewith. Thus, a predetermined bias voltage for diodes 169a and 169b is developed across resistor 167. Further, as shown, a discharging resistor 170a for diode 169a is connected across the latter, and diode 169a has its cathode connected to voltage supply terminal 142, while its anode is connected through a resistor 171a and a capacitor 172 to the collector of transistor 156. Similarly, a discharging resistor 170b is connected across diode 169b which has its anode connected to the collector of transistor 163, while the cathode of diode 169b is connected through a resistor 171b and capacitor 172 to the collector of transistor 156. In the compressing circuit 132 the resistors 170a and 170b have the same values, and the resistors 171a and 171b have the same values.

Figure 14C:
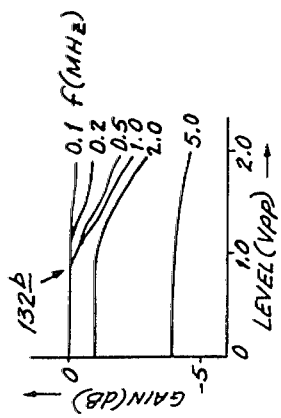
Figure 14B:
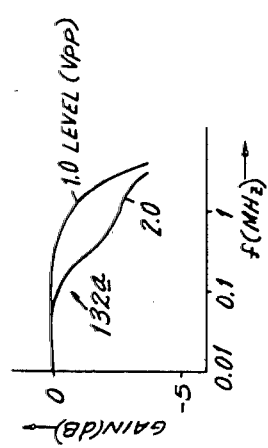
Figure 14A:
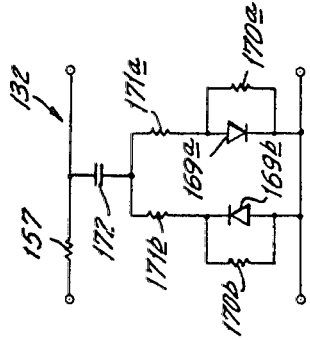

The above described compressing circuit 132 in which capacitor 168 is effective to shunt resistor 167 in respect to AC, can be represented by the AC equivalent four-terminal circuit shown on FIG. 14A. From a direct current viewpoint, since resistors 170a and 170b are equal and resistors 171a and 171b are equal, the bias voltage at the junction point between resistors 171a and 171b will be one-half the voltage developed across resistor 167 on FIG. 11. This bias voltage determines the AC impedance characteristic of diodes 169a and 169b in respect to the input level of the video signals. The operation of compressing circuit 132 is generally similar to that of the previously described compressing circuit 135. More particularly, compressing circuit 132 has a gain-frequency characteristic for different input signal levels represented by curves 132a on FIG. 14B, while the gain-input signal level characteristic of compressing circuit 132 for different frequencies is represented by the curves 132b on FIG. 14c. As is apparent from such gain-frequency and gain-input characteristics, compressing circuit 132 is effective to reduce the gain of transistor 156 for compressing the video signal applied to frequency modulator 44 as both the frequency and signal level of the video signal become high. However, the amount of compression effected by compressing circuit 132 is relatively small in comparison with the amount of compression by compressing circuit 135, that is, compressing circuit 132 is provided particularly to attenuate or compress only signals having a large amplitude. In view of the foregoing, compressing circuit 132 can be used in place of the white and dark clipping circuit 42 of the recording circuit shown on FIG. 1 for compressing the output of pre-emphasis circuit 41 of apparatus 130 when recording is effected with the normal tape speed. Furthermore, in compressing circuit 132, fluctuations in the forward voltage drop of diodes 169a and 169b due to temperature variations may be compensated by suitably selecting the ratio of the resistance values of resistors 166 and 167.

Referring now to FIG. 12, it will be seen that, in the reproducing circuit there shown, the circuit 133 which is operative for processing the demodulated signals from frequency modulator 62 when reproducing video signals recorded and reproduced with the slow or long-playing tape speed includes, in succession, an expander circuit 173, a de-emphasis circuit 174, a de-emphasis circuit 175, an expander circuit 176, a de-emphasis circuit 177, and finally, the DC level correcting circuit 71 corresponding to the previously described circuit identified by the same reference numeral on FIG. 2, and which has its output connected to contact L of switch SW$_4$. Expander circuit 173 and de-emphasis circuits 174 and 175 have characteristics that are generally complementary to the characteristics of compressing circuit 132 and pre-emphasis circuits 136 and 137, respectively, and which combine to provide a non-linear de-emphasis circuit indicated generally by the reference numeral 178. Expander circuit 176 and de-emphasis circuit 177 have characteristics that are generally complementary to the characteristics of compressing circuit 135 and pre-emphasis circuit 134, respectively, and which combine to provide a non-linear de-emphasis circuit indicated generally by the reference numeral 179.

Referring now to FIG. 13, it will be seen that, in an actual circuit arrangement of processing circuit 133, demodulated video signals from frequency demodulator 62 received by an input terminal 180 are applied to the base of a transistor 181 of emitter-follower configuration. The collector of transistor 181 is connected to a voltage supply terminal 182, while the emitter of transistor 181 is grounded through a resistor 183 and further connected through a resistor 184 to the base of a transistor 185. A trap circuit 186 is connected between the base of transistor 185 and ground, and is shown to be in the form of a series resonant circuit consisting of a capacitor 187 and an inductor 188. The series resonant circuit forming trap circuit or filter 186 has its elements dimensioned to provide a center frequency which is approximately twice the frequency $f_o$ (FIG. 19) at which pre-emphasis circuit 137 provides a relatively large amount of emphasis, for example, the center frequency of trap circuit 186 is selected to be approximately 4 MHz. Thus, trap circuit 186 is effective to attenuate the carrier leak in the demodulated video signals that occurs due to the non-linearity of magnetic recording and reproducing systems and which, as is well-known, manifests itself in the reproduced signals as a second harmonic of the recording signal. The emitter of transistor 185 is grounded through a resistor 189, while the collector of transistor 185 is connected to voltage supply terminal 182 through a resistor 190 having a series circuit of a capacitor 191 and a resistor 192 connected thereacross. Resistors 190 and 192 and capacitor 191 constitute the de-emphasis circuit 174 connected to the collector of transistor 185 and having a de-emphasis characteristic complementary to the emphasis characteristic of pre-emphasis circuit 136 as previously mentioned.

The emitter of transistor 185 is further connected through a capacitor 193 to one end of a parallel resonant circuit composed of an inductor 194, a resistor 195 and a capacitor 106, and constituting a trap circuit 197. The other end of the parallel resonant circuit constituting trap circuit 197 is connected through a resistor 198a to the anode of a diode 199a having a discharging resistor 200a connected thereacross, and also through a resistor 198b to the cathode of a diode 199b having a discharging resistor 200b connected thereacross. The cathode of diode 199a is connected to voltage supply terminal 182, while the anode of diode 199b is connected to the collector of a transistor 201. The collector of transistor 201 is further connected through a resistor 202 to voltage supply terminal 182, and the emitter of transistor 201 is grounded through a resistor 203. A capacitor 204 is shown to be connected across resistor 202, while the base of transistor 201 has a suitable base bias voltage applied thereto by means of voltage dividing resistors 205 and 206 connected between voltage supply terminal 182 and ground. Transistor 201 constitutes a constant current source for producing a predetermined voltage across resistor 202, and fluctuations in the forward voltage drop of diodes 199a and 199b due to temperature variations may be compensated by suitably determining the ratio of the resistance values of resistors 202 and 203. It will be noted that capacitor 193 and diodes 199a and 199b form expander circuit 173 connected to the emitter of transistor 185 and having a non-linear expanding characteristic substantially complementary to the non-linear compressing characteristic of compressing circuit 132, as described above with reference to 14B and 14C.

In the example presently being described, trap circuit 197 constituted by the parallel resonant circuit of inductor 194, resistor 105 and capacitor 196 is particularly adapted to attenuate 2 MHz components. The diodes 199a and 199b are nonconductive when a video signal of relatively low level or relatively low frequency is applied to expander circuit 173, in which case, the video signal is transmitted without undergoing expansion by expander circuit 173 and without attenuation by trap circuit 197. As the demodulated video signal applied from demodulator 62 to expander circuit 73 increases in level and frequency, the impedance of diode 199a or 199b decreases and, as a result thereof, the gain of transistor 185 is increased to increase the amount of expansion of the video signal by circuit 173. Moreover, as the amount of expansion of the video signal by circuit 173 is increased, the components of the video signal at about 2 MHz are reduced or attenuated considerably in trap circuit 197, with the amount of attenuation by trap circuit 197 being substantially proportionate to the amount of expansion by circuit 173. In connection with the foregoing, it should be noted that the amount of attenuation by trap circuit 197 increases in correspondence with increases in the level of the components of the video signal having frequencies of about 2 MHz. In other words, trap circuit 197 combines with expander circuit 173 for depressing the frequency characteristic of expander circuit 173 at about 2 MHz, and thereby compensates for the inability of de-emphasis circuit 175 to provide adequate attenuation of high level components of the demodulated video signals of about 2 MHz.

It is further to be noted that the resistance value of resistor 198a is preferably made larger than that of resistor 198b so that the bias voltage at the junction of resistors 198a and 198b in expander circuit 173 is somewhat shifted from one-half the voltage across resistor 202 when diodes 199a and 199b are non-conductive. Thus, the bias voltage to diode 199a is smaller than the bias voltage to diode 199b. As a result of the foregoing, diode 198a is made conductive at a lower level than diode 198b so that positive overshoots in the video signal are expanded more than the negative overshoots. Such difference between the levels at which diodes 198a and 198b are made conductive is adopted to provide compensation for a peculiarity of video tape recorders of the type in which two rotary heads are employed for recording and reproducing and further in which the video signal is frequency modulated for the recording thereof and the reproduced signal is then frequency-demodulated. When, for example, a pulse signal as shown on FIG. 21A is applied to the recording circuit of such a video tape recorder, the pulse signal is pre-emphasized in the recording circuit so as to have symmetrical positive and negative overshoots, as shown on FIG. 21B. Thereafter, the pre-emphasized pulse signal with overshoots is compressed in the recording circuit, as shown on FIG. 21C before being frequency modulated on a suitable carrier. When the resulting frequency modulated signal i recorded on a magnetic tape and then reproduced therefrom, the upper side band of the frequency modulated signal is not fully transmitted because of the narrow transmission band width of the video tape recorder. As a consequence, when the recorded frequency modulated signal is reproduced and then frequency-demodulated, the resulting pulse signal will have an asymmetric waveform, as shown on FIG. 21D, in which the positive overshoots are smaller than the negative overshoots. However, as previously described, if the resistance value of resistor 198a is made greater than that of resistor 198b, expander circuit 173 is adapted to provide more emphasis to the positive overshoots than to the negative overshoots, so as to permit reproducing circuit 130 to provide video signals at terminal 64 which are high fidelity reproductions of the video signals originally applied to input terminal 38.

If desired, the result obtained from arranging expander circuit 173 for providing different amounts of expansion of the positive and negative overshoots, as described above, may be similarly obtained by arranging compressing circuit 132 in the recording circuit so that the same will provide different amounts of compression in respect to the positive and negative overshoots, respectively.

The video signals, after being subjected to expansion and de-emphasis by circuits 173 and 174, respectively, are supplied from the collector of transistor 185 to the base of a PNP transistor 207. The emitter of transistor 207 is connected through a resistor 208 to voltage supply terminal 182, while the collector of transistor 207 is grounded through a resistor 209 and, in parallel with the latter, through a series circuit of a capacitor 210, an inductor 211 and a resistor 212. Resistors 209 and 212, capacitor 210 and inductor 211 connected to the collector of transistor 207 constitute de-emphasis circuit 175 having a de-emphasis characteristic substantially complementary to the pre-emphasis characteristic 137a (FIG. 19) of pre-emphasis circuit 137. Thus, as a result of the attenuation provided by trap circuit 197 and the de-emphasis provided by de-emphasis circuit 175, the non-linear de-emphasis circuit 178 provides a suitably large amount of de-emphasis of components of the reproduced signal which are of relative high level and have frequencies of about 2 MHz. The collector of transistor 207 is shown to be connected to the base of a transistor 213 which forms a buffer amplifier, and which has its emitter connected through a capacitor 214 to the base of a transistor 217 having a suitable base bias applied thereto by voltage dividing resistors 215 and 216 connected between voltage supplying terminal 182 and ground. The emitter of transistor 217 is grounded through a resistor 218 which is shunted by a series circuit consisting of a resistor 226, a capacitor 219, and a parallel circuit of a resistor 221 for discharging capacitor 219 and diodes 220a and 220b arranged with opposed polarities. The foregoing elements connected to the emitter of transistor 217 form expander circuit 176 having characteristics that are substantially complementary to the characteristics of compressing circuit 135 described above with reference to FIGS. 16B and 16C.

Further, as shown on FIG. 13, the collector of transistor 217 is connected to voltage supply terminal 182 through a resistor 222 having a series circuit of a capacitor 223 and resistor 224 in parallel with resistor 222 so as to form with the latter the deemphasis circuit 177 having a de-emphasis characteristic that is substantially complementary to the preemphasis characteristic 134a (FIG. 15B) of the pre-emphasis circuit 134. Thus, the non-linear de-emphasis circuit 179 constituted by expander circuit 176 and de-emphasis circuit 177 has a non-linear de-emphasis characteristic which is substantially complementary to the non-linear pre-emphasis characteristic of the circuit 138 in the recording circuit of FIG. 10. Finally, the collector of transistor 217 is connected to an output terminal 225 which is suitably connected to DC level correcting circuit 71.

Although the non-linear de-emphasis characteristics of circuits 178 and 179 in the reproducing circuit have been described above as being substantially complementary to the non-linear preemphasis characteristics of circuits 139 and 138, respectively, in the recording circuit of FIG. 10, the de-emphasis and pre-emphasis characteristics are not necessarily symmetrical. For example, in the embodiment of circuits 178 and 179 shown on FIG. 13, resistor 226 connected between the emitter of transistor 217 and capacitor 219 causes the amount of expansion of the signals by expander circuit 176 to be somewhat less than would be provided by an expansion characteristic that is precisely complementary to the compressing characteristic of compressing circuit 135. Consequently, the reproduced video signals, after being processed by circuit 133 on FIG. 12, are somewhat attenuated at the high frequency portions thereof so as to further promote the elimination from the video signals provided at output terminal 64 of interfering signals due to cross-talk and FM noise signals.

Referring now to FIG. 22, it will be seen that, in a modification of a portion of the circuit arrangement shown on FIG. 13, the trap circuit 197 of the latter is replaced by a trap circuit 227 formed by a series resonant circuit of a capacitor 228 and an inductor 229 connected between the base of transistor 185 and ground and being operative to attenuate frequency components of about 2 MHz. Further, in the modification illustrated on FIG. 22, the collector of transistor 185 is shown to be connected to the base of a transistor 230, and the emitter of transistor 230 is connected to ground through a series resonant circuit of a capacitor 231, an inductor 232 and a resistor 233 forming a peaking circuit. Moreover, the emitter of transistor 230 is connected to ground through a resistor 234, while the collector of transistor 230 is connected to the base of transistor 207 and, through a resistor 235, to the voltage supply terminal 182. The previously mentioned peaking circuit on FIG. 22 serves to compensate for the attenuation due to trap circuit 227. Apart from the foregoing, the circuit arrangement of FIG. 22 is otherwise similar to that of FIG. 13, with the exception that the trap circuit 186 shown on FIG. 13 for the carrier leak of about 4 MHz is omitted.

As is indicated by the line 234a on FIG. 20, the level of the FM noise signal that is mixed with the demodulated video signals as a result of the magnetic recording and reproducing of frequency modulated video signals increases generally in proportion to the frequency of the frequency modulated signals. In the recording and reproducing apparatus 130 according to this invention, the substantially complete elimination of the FM noise signal is made possible, even when a relatively high carrier frequency is employed for the frequency modulation, by the cooperative action of the non-linear pre-emphasis circuit 138 and the substantially complementary non-linear de-emphasis circuit 179. In other words, pre-emphasis circuit 134 provides an amount of emphasis and de-emphasis circuit 177 provides an amount of de-emphasis which are large enough to eliminate the FM noise signal of substantial level, while compressing circuit 135 provides a greater amount of compression in respect to high level, high frequency signal components than in respect to low level, high frequency signal components for ensuring that distortions will not occur when the corresponding video signals are frequency modulated in modulator 44, and expander circuit 176 provides an amount of expansion corresponding to the compression in circuit 135 and which similarly varies with both the level and frequency of the signals.

It is generally recognized that, when one of the rotary heads, for example, the head 31a, scans a respective track $T_A$ during reproducing with the slow or long-playing tape speed and thus reproduces the video signals recorded in such scanned track $T_A$ as well as a cross-talk signal, that is, signals recorded in an adjacent track $T_B$, the level of the interfering signal will become relatively high when the frequency difference between the main video signal being reproduced from track $T_A$ and the cross-talk signal from track $T_B$ becomes large. Such a large frequency difference between the video signal being reproduced from track $T_A$, that is, the main video signal, and the cross-talk signal being reproduced from track $T_B$ is particularly encountered when the video signals recorded in the next adjacent tracks are not in H-alignment. Such relatively high level interfering signal due to cross-talk, if not removed in the reproducing circuit of the apparatus, would be superimposed on the demodulated reproduced video signals and would appear as conspicuous noises on the reproduced picture.

As is indicated by the curve 234b on FIG. 20, the interfering signal due to cross-talk varies irregularly in respect to the frequency difference between the main reproduced signal and the cross-talk signal. More particularly, as shown, the interfering signal due to cross-talk, as included in the output of demodulator 62, attains levels significantly greater than the FM noise signal for frequency differences in the band from about 50 KHz to about 500 KHz. Furthermore, as shown, when the frequency deviation of the frequency modulated video signals is selected to be approximately in the band from 3.5 to 4.8 MHz, as shown on FIG. 8, a particularly high level of interfering signals due to cross-talk exists at frequencies about 2 MHz.

It will be apparent that pre-emphasis circuit 134 and the corresponding de-emphasis circuit 177 cannot be employed for eliminating the interfering signal due to cross-talk having the frequency characteristic indicated by the curve 234b on FIG. 20.

More particularly, the amount of emphasis provided by pre-emphasis circuit 134, if applied to frequency components in the range from 50 to 500 KHz which have high levels, would result in overshoots and undershoots which have to be clipped for the frequency modulation, and thus would result in distortions in the demodulated reproduced video signals. Thus, pre-emphasis circuit 136 and the corresponding de-emphasis circuit 174 provide relatively small amounts of emphasis and de-emphasis, respectively, with a low cutoff point so as to be effective to remove or eliminate particularly the interfering signal due to cross-talk in the frequency band of about 50 to 500 KHz. On the other hand, the amounts of emphasis and de-emphasis provided by pre-emphasis circuit 134 and de-emphasis circuit 177 are inadequate to remove or eliminate the relatively high level interfering signal due to cross-talk at about 2 MHz and which is generated particularly at portions of the video signals where the level of the latter change abruptly, for example, as in the case of video signals defining the border or demarcation between white and black areas of the picture. Accordingly, in the apparatus 130 according to this invention, pre-emphasis circuit 137 having the characteristic 137a on FIG. 19 and the corresponding de-emphasis circuit 175 are provided for removing the relatively high level interfering signal with a frequency of about 2 MHz. Since the characteristic 137a of pre-emphasis circuit 137 has a high-Q or is a sharp characteristic, as distinguished from the characteristics 134a and 136a of pre-emphasis circuits 134 and 136, an increase of spurious noise in the reproduced video signals at output terminal 64 is avoided.

In the embodiments of the invention described above with reference to FIGS. 1 and 2 and FIGS. 10 and 12, respectively, the video signals applied to the input terminal 38 to be recorded and reproduced were monochrome or black and white video signals containing only luminance information. However, as shown on FIG. 23, the invention may also be desirably embodied in an apparatus 230 for recording and reproducing color video signals composed of both chrominance and luminance components, and in which elements corresponding to those previously described with reference to FIGS. 1 and 2 or FIGS. 10 and 12 are identified by the same reference numerals. More particularly, it will be noted that, in the apparatus 230, the invention is particularly applied to the high frequency portion or luminance component of the color video signals for eliminating the FM noise signal and the interfering signal due to cross-talk in respect to the luminance component, particularly as previously described with reference to the embodiment of FIGS. 10 and 12, whereas the interfering signal due to cross-talk in respect to the chrominance component is eliminated by recording the chrominance component with different carriers in adjacent tracks.

Figure 23:
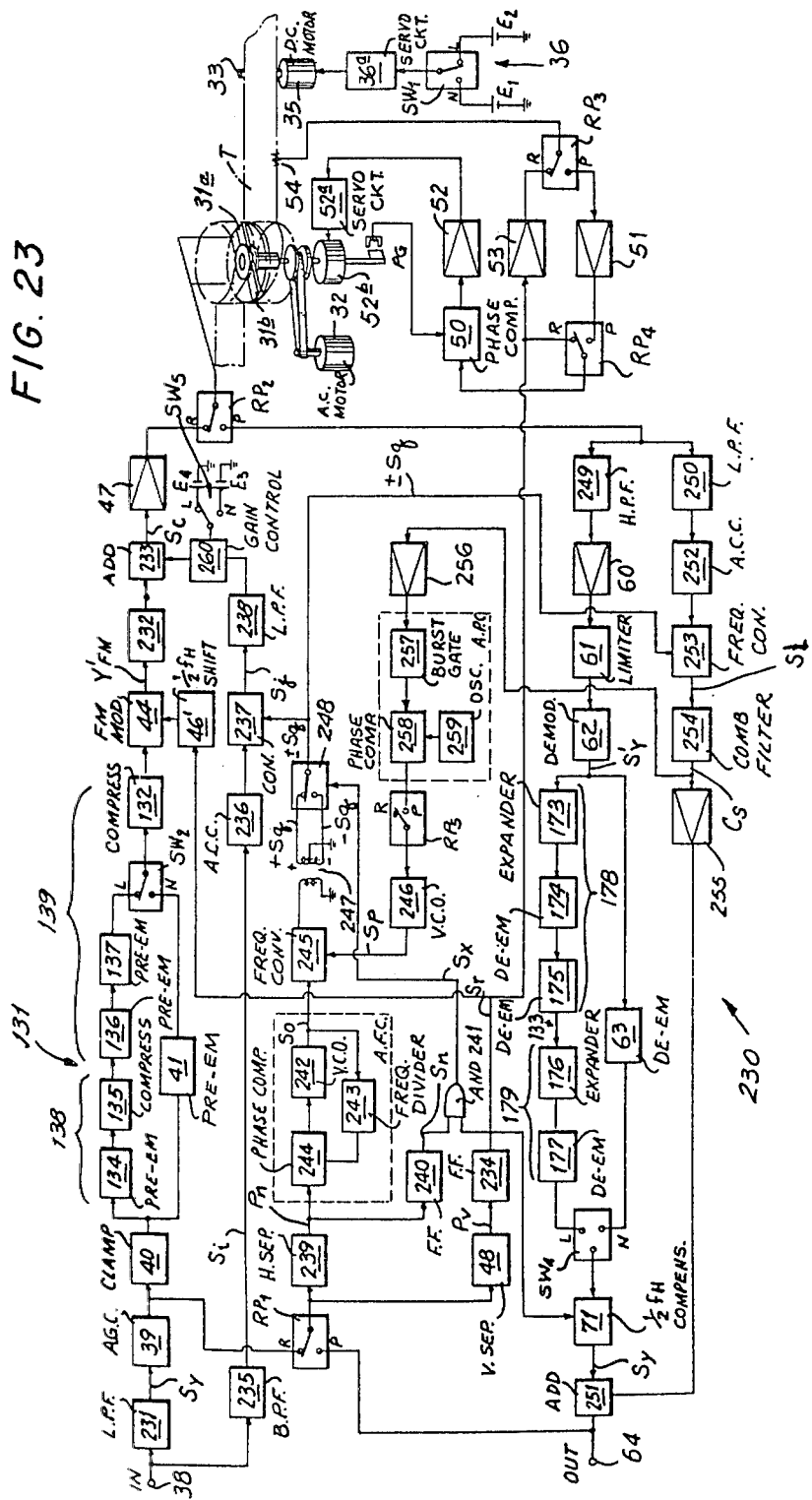
FIG. 23 is a schematic block diagram of an apparatus according to another embodiment of this invention for recording and reproducing color video signals.

Referring to FIG. 23 in detail, it will be seen that, in the recording section of apparatus 230, an input terminal 38 receives the color video signals which include luminance and chrominance components and are composed of line, field and frame intervals with blanking and synchronizing portions in each of those intervals. Such color video signals are applied from terminal 38 to a low pass filter 231 which transmits substantially only the luminance component or signal $S_Y$ to an automatic gain control circuit 39. The gain controlled luminance component from circuit 39 is applied to a clamp circuit 40 which clamps the sync-tip level of the luminance component to a fixed reference level. Thereafter, in dependence on the condition of a switch $SW_2$ for selecting either the normal or long-playing recording operation, the clamped luminance component is passed either through a pre-emphasis circuit 41 or a signal processing circuit 131 to a compressing circuit 132 and, through the latter, to a frequency modulator 44 for frequency modulating a suitably high frequency carrier in the latter. It will be understood that pre-emphasis circuit 41, signal processing circuit 131 and compressing circuit 132 are preferably similar to the correspondingly numbered components described above with reference to FIG. 10. The frequency modulated luminance component $Y_{FM}$ issuing from modulator 44 is passed through a high-pass filter 232 to a mixing or adding circuit 233.

In the apparatus 230, the carrier frequency of the frequency modulated luminance component $Y'_{FM}$ issuing from modulator 44 is shifted between first and second carrier frequency which are in frequency interleaving relation to each other, and such shifting of the carrier frequency is controlled so that the frequency modulated luminance component, as recorded in tracks which are next adjacent to each other, has the first and second carrier frequencies, respectively, both during a normal recording operation and a long-playing recording operation. In order to effect the foregoing in apparatus 230, the output of automatic gain control circuit 39 is also applied through an R contact of a record-playback switch $RP_1$ which, in its recording position, as shown, applies the same to a vertical synchronizing signal separating circuit 48. The vertical synchronizing signals $P_v$ thus separated from the incoming video signals is applied to a flip-flop circuit 234 for providing the control signal $S_r$ (FIG. 9) of rectangular waveform which is, in turn, applied to a circuit 46' by which the carrier frequency modulated in frequency modulator 44 is shifted by $\frac{1}{2}f_H$ for successive field intervals of the video signals, as previously described.

The color video signals applied to input terminal 38 are also supplied from the latter to a band pass filter 235 which separates the chrominance component $S_i$ from the color video signals and passes such chrominance component through an automatic color control circuit 236 to a frequency converter 237 in which the chrominance equipment is converted to a frequency band lower than that of the frequency modulated luminance component $Y'_{FM}$ supplied to mixing circuit 233. The resulting frequency converted component $S_j$ is supplied from frequency converter 237 through a low-pass filter 238 to another input of mixing circuit 233 so as to be combined in the latter with the frequency modulated luminance component $Y'_{FM}$ for providing a composite signal $S_c$ which is supplied through a recording amplifier 47 and a record contact R of a record-playback switch $RP_2$ to the rotary heads 31a and 31b.

The output of flip-flop 234, which corresponds to the divider 49 on FIG. 1, is applied through an amplifier 53 to a record contact R of a record-playback switch $RP_3$ which, in its recording position, as shown, applies the resulting control signals to a fixed transducer or head 54 for recording by the latter at spaced apart locations along a longitudinal edge of the tape T. It will be understood that such control signals recorded by fixed head 54 occur in correspondence with the recording of color video signals in alternating, or every other one of the tracks so as to identify or distinguish between the tracks in which the frequency modulated luminance component is recorded with first and second carrier frequencies and the chrominance component is recorded with first and second carriers, as hereinafter described in detail.

The control signal $S_r$ from divider or flip-flop 234 is also employed in a servo system for regulating the rotary movements of heads 31a and 31b. As shown, control signal $S_r$ is applied to the R contact of a record-playback switch $RP_4$ which, in its illustrated recording position, applies control signal $S_r$ to one of the inputs of a phase comparator 50. Another input of phase comparator 50 receives the rotation indicating pulses from generator 37 associated with the shaft of heads 31a and 31b. Comparator 50 compares the phases of the control signals $S_r$ from flip-flop 234 and of the pulse signals from generator 37 and provides a corresponding brake-control or servo signal which is passed through an amplifier 52 to a servo circuit 52a for either suitably decreasing or increasing the braking force exerted by a brake 52b acting on the shaft of rotary heads 31a and 31b. Thus, the speed at which heads 31a and 31b is rotated by a motor 32 is regulated so that heads 31a and 31b will commence to move along respective tracks $T_A$ and $T_B$ on tape T at the commencement of alternating field intervals of the color video signals being recorded.

The gain controlled luminance component from circuit 39 is further shown to be applied through record-playback switch $RP_1$ to a horizontal synchronizing signal separator 239 which separates the horizontal synchronizing signals $P_h$ therefrom for application to a flip-flop 240. The resulting rectangular waveform or control signal $S_h$ from flip-flop 240 has successive high and low intervals each equal to one line interval H and is applied to one input of an AND circuit 241 which, at its other input, receives the rectangular waveform or signal $S_r$ from flip-flop 234 having successive high and low intervals each equal to one field interval. As a result of the foregoing, the output or control signal $S_x$ from AND circuit 241 remains low during each field interval recorded in a track $T_A$ and goes high only during alternate line intervals of each field interval recorded in a track $T_B$. In the illustrated recording and reproducing apparatus 230, such output or control signal $S_x$ from AND circuit 241 is employed for controlling the establishment of different carriers for the frequency converted chrominance component $S_j$ to be recorded in tracks that are next adjacent to each other, with such carriers differing from each other in their polarity characteristics as described in detail in U.S. Pat. No. 3,925,910, No. 4,007,482 and No. 4,007,484.

In the illustrated apparatus 230, the circuit for frequency converting the chrominance component $S_i$ and for providing the different carriers with which the frequency converted chrominance component $S_j$ is recorded in tracks that are next adjacent each other is shown to include a voltage controlled oscillator 242 providing an output $S_o$ with a center frequency of, for example $44f_H$. The output $S_o$ of oscillator 242 is applied to a frequency divider 243 to be divided in the latter by 44, and the output of divider 243 is applied to a comparator 244 which also receives the separated horizontal synchronizing signals $P_h$ from separator 239. It will be appreciated that comparator 244 compares the frequency of the output from divider 243 with the frequency $f_H$ of the separated horizontal synchronizing signals $P_h$ and, upon any deviation therebetween, provides a suitable control voltage to voltage controlled oscillator 242 for automatically maintaining the output $S_o$ at a frequency of $44f_H$.

The output $S_o$ of oscillator 242 is applied to a frequency converter 245 in which the output $S_o$ is frequency converted by a frequency converting signal $S_p$ from a voltage controlled oscillator 246 having a center frequency of $f_i - \frac{1}{4}f_H$, in which $f_i$ is the original or standard carrier frequency of the chrominance component $S_i$ of the color video signals being recorded. The output of frequency converter 245 is applied to a transformer 247 having a center tapped secondary with two outputs ± of opposite polarity at which frequency converting signals $+S_q$ and $-S_q$, respectively appear. Such frequency converting signals $+S_q$ and $-S_q$ are of opposite phase or polarity and have the frequency $(f_i + 44f_H - \frac{1}{4}f_H)$. The frequency converting signals $+S_q$ and $-S_q$ are alternatively applied to frequency converter 237 through a switching circuit 248 which is controlled by the control signal $S_x$ from AND circuit 241 so that frequency converting signal $+S_q$ is applied to converter 237 whenever control signal $S_x$ has a low value, and frequency converting signal $-S_q$ is applied to converter 237 whenever control signal $S_x$ has a high value. Frequency converting signals $+S_q$ and $-S_q$ alternately applied to frequency converter 237 are effective in the latter to convert the carrier of the chrominance component from its original carrier frequency $f_i$ to a relatively lower carrier frequency $f_c = 44f_H - \frac{1}{4}f_H$. As a result of the foregoing, the frequency converted chrominance component $S_j$ applied from frequency converter 237 through filter 238 to mixing or adding circuit 233 has a frequency band lower than that of the frequency modulated luminance component $Y'_{FM}$. During intervals when the frequency converting signal $-S_q$ is applied to frequency converter 237, the polarity or phase of the carrier of the frequency converted chrominance component $S_j$ is reversed as compared with the phase or polarity of such carrier during the interval when the frequency converting signal $+S_q$ is applied to frequency converter 237.

It will also be noted that the carrier frequency $f_c$ of the frequency converted chrominance component $S_j$ satisfies the equation $$f_c = \tfrac{1}{4} f_H (2m - 1)$$

in which m is a whole positive integer. Of course, in the present case, in which $f_c 44 f_H - \tfrac{1}{4} f_H$, the value m in the above equation is 88.

As a result of the described selection of the carrier frequency of the frequency converted chrominance component $S_j$, the second harmonic of the carrier of the frequency converted chrominance component is interleaved with the luminance component so as to avoid beat interference therebetween. By avoiding such beat interference, the frequency converted chrominance component can be recorded with a relatively high amplitude in respect to the amplitude of the frequency modulated luminance component for obtaining a good signal-to-noise (S/N) ratio of the chrominance component, as described in detail in U.S. Pat. No. 3,730,983, having a common assignee herewith.

The frequency converted chrominance component $S_j$ and the frequency modulated luminance component $Y'_{FM}$ are combined in mixing circuit 233 with the frequency converted chrominance component amplitude modulating the frequency modulated luminance component to provide the combined or composite signal $S_c$ which is applied through amplifier 47 and record-playback switch RP$_2$, in the record position of the latter, to heads 31a and 31b for recording by such heads in the successive parallel tracks on tape T.

In the apparatus 230 the speed of rotation of a motor 35 for driving a capstan 33 is controlled through a servo circuit 36a which selectively receives either a control voltage E$_1$ or a control voltage E$_2$ from a motor control circuit 36 in dependence on the position of a switch SW$_1$. Thus, when switch SW$_1$ engages its L contact for applying the control voltage E$_2$ to servo circuit 36a, the latter effects rotation of motor 35 at a speed suitable to cause capstan 33 to drive tape T at the slow or long-playing speed. Alternatively, when switch SW$_1$ engages its contact N, the control voltage E$_1$ thus applied to servo circuit 36a causes capstan 33 to drive the tape at the normal tape speed. Further, it will be appreciated that switches SW$_1$ and SW$_2$ are ganged or interconnected for simultaneously selecting the conditions for recording either at the normal tape speed or the long-playing tape speed.

Similarly, the record-playback switches RP$_1$-RP$_4$ are ganged or interconnected so as to be simultaneously changed-over from their recording positions shown on FIG. 23 to their reproducing or playback positions in which the movable contact of each of the enumerated switches engages a respective playback contact P. In the reproducing or playback section of apparatus 230, the playback terminal P of switch RP$_2$ is connected to a high pass filter 249 and a low pass filter 250 so as to apply to such filters the signals being alternately reproduced by heads 31a and 31b from the successive parallel tracks T$_A$ and T$_B$ on tape T. The filters 249 and 250 respectively separate the frequency modulated luminance component $Y'_{FM}$ and the frequency converted chrominance component $S_j$ from the reproduced signals. The frequency modulated luminance component $Y'_{FM}$ separated from the reproduced signals is passed through an amplifier 60 and a limiter 61 to a frequency demodulator 62 so as to obtain a demodulated luminance component $S'_Y$. The demodulated luminance component $S'_Y$ is then processed in the same manner as has been described above with reference to FIG. 12. In other words, when reproducing with the slow or long-playing tape speed, the demodulated luminance component $S'_Y$ is passed through a signal processing circuit 133 and then by way of the L contact of switch SW$_4$ and DC level compensating or correcting circuit 71 to an input of an adding or mixing circuit 251. On the other hand, when reproducing with the normal tape speed, the demodulated luminance component $S'_Y$ is passed through de-emphasis circuit 63, the N contact of switch SW$_4$ and circuit 71 to the adding or mixing circuit 251.

The frequency converted chrominance component $S_j$ separated from the reproduced signals by filter 250 is applied through an automatic color control circuit 252 to a frequency reconverter 253 which alternatively receives the frequency converting signals $+S_q$ and $-S_q$ from switching circuit 248, and by which the carrier of the reproduced chrominance component $S_j$ is reconverted to the original carrier frequency $f_i$. The resulting frequency reconverted chrominance component $S'_i$ is passed through a comb filter 254 in which, as hereinafter described in detail, chrominance components of cross-talk signals are cancelled or suppressed so that only the chrominance component $C_s$ of the video signals being reproduced from a particular track T$_A$ or T$_B$ by the head 31a or 31b, respectively, is passed through an amplifier 255 to mixing circuit 251 for combining in the latter with the luminance component $S_y$ from switch SW$_4$ and thereby forming the desired reproduced video signals applied to output terminal 64.

The output of comb filter 255 is also shown to be supplied through an amplifier 256 to a burst gate 257 which extracts burst signals from the reconverted chrominance signal component $S'_i$ and applies the extracted burst signals to one input of a phase comparator 258. An oscillator 259 provides an output at the standard or original carrier frequency $f_i$ for the chrominance component, and such output is applied to a second input of comparator 258. The output of phase comparator 258 is connected to a playback terminal P of a switch RP$_5$ which is also ganged or interconnected with the record-playback switches RP$_1$-RP$_4$ so as to be effective, in the playback or reproducing mode of operation of apparatus 230, to apply the output of phase comparator 258 as a control voltage to the voltage controlled oscillator 246. It will be apparent that, in the reproducing mode of operation, any phase difference between the burst signals extracted by gate 257 from the reconverted chrominance component and the output of oscillator 259 causes comparator 258 to apply a suitable control voltage to voltage control oscillator 246 for effecting a required change in the phase of the converting signals $+S_q$ and $-S_q$, whereby to achieve an automatic phase control function for eliminating so-called jitter from a picture or image produced by a cathode ray tube in response to color video signals obtained at output terminal 64.

In the reproducing mode of operation of apparatus 230, control signal $S_x$ for operating switching circuit 248 is again obtained from AND circuit 241 in response to the control signals $S_r$ and $S_h$ from flip-flops 234 and 240, respectively. However, in the reproducing mode of operation, the reproduced video signals from mixing circuit 251 are applied through contact P of record-playback switch RP$_1$ to the vertical and horizontal synchronizing signal separating circuits 48 and 239 so that flip-flops 234 and 240 are respectively triggered by the vertical and horizontal synchronizing signals separated from the reproduced color video signals. Further, in the reproducing mode of operation, fixed head 54 reproduces the recorded control signals which distinguish the tracks $T_A$ from the tracks $T_B$, and the control signals reproduced by head 54 are applied to one input of phase comparator 50 through contact P of record-playback switch RP$_3$, an amplifier 51 and contact P of record-playback switch RP$_4$. The other input of phase comparator 50, as before, receives the rotation indicating pulses from generator 37 so that phase comparator 50 applies a suitable control signal through amplifier 52 to servo circuit 52$a$ for causing brake 52$b$ to suitably control the rotation of heads 31$a$ and 31$b$ by motor 32. It will be apparent that the described servo control arrangement is effective, in the reproducing mode of operation, to insure that each of the tracks on tape T will be scanned by the same head 31$a$ or 31$b$ which was employed for recording video signals in such track.

The above described recording and reproducing apparatus 230 operates as follows:

RECORDING MODE OF OPERATION

In the recording mode of operation of apparatus 230, each of switches RP$_1$–RP$_5$ is in its recording position so as to engage the respective recording contact R, as shown on FIG. 23. In the recording operation of apparatus 230, the control signal $S_r$ from flip-flop 234 triggered by vertical synchronizing signals $P_v$ separated from the luminance component $S_Y$ of the color video signals applied to input terminal 38 is compared, in phase comparator 50, with the output of the rotation indicating pulses from generator 37 so as to provide a suitable servo control signal by which the rotary movements of heads 31$a$ and 31$b$ are controlled for causing such heads to commence the scanning of alternating tracks $T_A$ and $T_B$ on the tape at the commencement of respective field intervals of the color video signals.

During recording, the operation of frequency shifting circuit 46' is controlled by control signal $S_r$ from flip-flop 234 so as to establish the desired difference of $\frac{1}{2}f_H$ between the carrier frequencies with which the frequency modulated luminance component $Y'_{FM}$ is recorded in alternating tracks on the tape T. In other words, the frequency modulated luminance component $Y'_{FM}$ of the composite or combined signal $S_c$, as recorded by heads 31$a$ and 31$b$ in tracks which are next adjacent to each other on tape T, have different carrier frequencies which are in frequency interleaving relation to each other.

Further, during recording, the chrominance component $S_i$ separated from the incoming color video signals and having the original or standard carrier frequency $f_i$, is acted upon in frequency converter 237 by the frequency converting signal $+S_q$ or $-S_q$ so as to provide the frequency converted chrominance component $S_j$ with the reduced carrier frequency $f_c=44f_H-\frac{1}{4}f_H$. Thus, the frequency band of the frequency converted chrominance component $S_j$ is lower than that of the frequency modulated luminance component $Y'_{FM}$ with which it is combined in mixing circuit 233 to constitute the composite or combined signal $S_c$ alternately recorded by heads 31$a$ and 31$b$ in the successive tracks on tape T. The alternative application of frequency converting signals $+S_q$ and $-S_q$ to frequency converter 237 is determined by switching circuit 248 which, in turn, is controlled by the control signal $S_x$ from AND circuit 241. Since frequency converting signals $+S_q$ and $-S_q$ are of opposite phase or polarity, the effect thereof in frequency converter 237 will be to provide the resulting frequency converted chrominance component $S_j$ with respective carriers $C_a$ and $-C_a$ which are similarly of opposed phase or polarity. By reason of the previously described configuration of control signal $S_x$, during each field interval recorded by head 31$a$, converting signal $+S_q$ is continuously applied to frequency converter 237 with the result that the successive line intervals of each field interval recorded by head 31$a$ in a respective track $T_A$ are provided with a carrier of the same polarity. On the other hand, during successive line intervals of each field interval recorded by head 31$b$ in a respective track $T_B$, frequency converting signals $+S_q$ and $-S_q$ are alternately applied to frequency converter 237 so that the successive line intervals of each field interval recorded by head 31$b$ are alternately recorded with the carriers $C_a$ and $-C_a$ of opposed polarity.

Of course, in the recording mode of operation of apparatus 230, switches SW$_1$ and SW$_2$ are made to engage either their N contacts or their L contacts depending upon whether the normal tape speed or the relatively slow or long-playing tape speed is to be employed for the recording operation. If the long-playing tape speed is selected for the recording operation, then the non-linear pre-emphasizing circuits 138 and 139 of signal processing circuit 131 are effective to provide the luminance component, prior to the frequency modulation thereof, with respective amounts of emphasis which vary with both the level and frequency of the luminance component in a manner to permit the eventual elimination from the reproduced luminance component of the FM noise signal and of the interfering signal due to cross-talk, as previously described with reference to the apparatus 130.

REPRODUCING MODE OF OPERATION

In the reproducing mode of operation of apparatus 230, switches RP$_1$–RP$_5$ are changed over to engage their respective reproducing or playback terminals P, and switches SW$_1$ and SW$_4$ are positioned to engage either their N contacts or their L contacts in dependence on the tape speed with which the video signals to be reproduced were originally recorded. During reproducing operation, signals reproduced alternately by heads 31$a$ and 31$b$ from the successive tracks on tape T are applied through switch RP$_2$ to filters 249 and 250 which respectively separate the frequency modulated luminance component $Y'_{FM}$ and the frequency converted chrominance component $S_j$ from the reproduced signals. In the reproducing operation of apparatus 230, the rotation of heads 31$a$ and 31$b$ is regulated, on the basis of a comparison of the control signals reproduced from the tape by fixed head 54 with the rotation indicating signals from generator 37, so that the signals recorded in tracks $T_A$ and $T_B$ of tape T by heads 31$a$ and 31$b$ will be reproduced by such heads 31$a$ and 31$b$, respectively. Further, as a result of such servo control of the rotation of heads 31a and 31b during reproducing, the control signal $S_r$ which controls the DC level correcting circuit 71 in signal processing circuit 133, and the control signal $S_x$ from AND circuit 241 which controls switching circuit 248 have the same relationships to the operative positioning of heads 31a and 31b as they have during the recording operation.

The frequency modulated luminance component $Y'_{FM}$ separated from the reproduced signals is demodulated in frequency demodulator 62 so as to obtain the demodulated luminance component $S'_Y$ which will have changes in the level thereof corresponding to the different carrier frequencies with which the frequency modulated luminance component $Y'_{FM}$ was recorded in the next adjacent tracks on tape T. However, by reason of the control signal $S_r$ applied to the DC level compensating or correcting circuit 71, the latter will eliminate such changes in level of the demodulated luminance component applied through signal processing circuit 133 to mixing circuit 251. During reproducing operation, the interfering signal due to cross-talk in respect to the luminance component of the video signals is eliminated partly by reason of the different azimuth angles with which the air gaps of heads 31a and 31b are preferably provided, and also partly by reason of the fact that the frequency modulated luminance component is recorded with different carrier frequencies in the adjacent tracks, which carrier frequencies differ from each other by $(m+\frac{1}{2})f_H$. Thus, when, for example, head 31a is scanning a track $T_A$, the frequency modulated luminance component reproduced from the track, that is, the main luminance component, and the frequency modulated luminance component reproduced by head 31a from an adjacent track $T_B$, that is, the cross-talk luminance component, will have respective carrier frequencies that differ by $(m+\frac{1}{2})f_H$. Thus, the interfering signal due to the cross-talk luminance component is in frequency interleaving relation to the frequency of the main reproduced luminance component. When the frequency modulated luminance component separated from the reproduced signals is demodulated in frequency demodulator 62, the demodulated luminance component $S'_Y$ will include the desired luminance component and also the interfering signal having the frequency $(m+\frac{1}{2})f_H$ with the result that the interfering or noise signal will be inverted in phase in successive horizontal intervals of the video signals. When the reproduced video signals obtained at output terminal 64 are applied to a cathode ray tube, the interfering signal due to luminance component cross-talk will tend to be visually cancelled on the screen of the cathode ray tube.

Moreover, when the recording and reproducing operations of apparatus 230 are performed with the long-playing tape speed, the non-linear de-emphasis circuits 178 and 179 of signal processing circuit 133 will be effective to complete the elimination from the luminance component $S_Y$ applied to mixing circuit 251 of the interfering signal due to cross-talk and of the FM noise signal, respectively, as previously described in detail with respect to apparatus 130.

Considering the frequency converted chrominance component, it should be noted that the effect of providing the same carriers $C_a, -C_a$ of reversed phase or polarity in successive line intervals or areas of each track recorded by head 31b is to provide a new carrier $C_b$ having frequency components offset by $\frac{1}{2}f_H$, or interleaving with respect to the frequency components of the carrier $C_a$ with which the frequency converted chrominance component is recorded in the next adjacent track by head 31a, as described in detail in U.S. Pat. No. 3,925,810.

Accordingly, in the reproducing operation of apparatus 230, when, for example, head 31a scans a track $T_A$ on tape T for reproducing the frequency converted chrominance component recorded therein with the carrier $C_a$, the undesired or cross-talk signal simultaneously reproduced by head 31a from the next adjacent track $T_B$ has its frequency converted chrominance component provided with a carrier in frequency interleaving relation to the carrier $C_a$.

During the reproducing operation of apparatus 230, switching circuit 248 is again controlled by control signal $S_x$ from AND circuit 241 so that frequency reconverter 253 continuously receives the frequency converting signal $+S_q$ during the scanning of a track by head 31a, and so that frequency converting signals $+S_q$ and $-S_q$ are alternately applied to frequency reconverter 253 for successive line intervals during the scanning of a track $T_B$ by head 31B. As a result of the foregoing, during the scanning of a track by head 31a, frequency reconverter 253 reconverts the carrier $C_a$ of the chrominance component then being reproduced to a carrier having the original or standard carrier frequency $f_i$, while the carrier of the cross-talk chrominance component has its frequency similarly shifted so as to be spaced midway between the principal side bands of the desired carrier. Similarly, during the scanning of a track $T_B$ by head 31b, frequency converter 253 frequency converts the carrier $C_b$ of the chrominance component being reproduced from such track to a carrier also having the original or standard frequency $f_i$, while the carrier of the cross-talk chrominance component then being reproduced has its frequency similarly shifted so as to be spaced midway between the principal side bands of the desired reconverted carrier. Thus, the reconverted carriers of the chrominance component reproduced during alternate field intervals both have the same carrier frequency $f_i$, while the chrominance component of the undesired or cross-talk signal is, in each case, spaced midway between the principal side bands of the desired carrier and can be eliminated by the comb filter 254 to yield the desired reconverted chrominance component $C_s$ free of any cross-talk chorminance component.

As further shown on FIG. 23, a gain control 260 for the frequency converted chrominance component may be interposed between low pass filter 238 and mixing circuit 233 so that, when recording with the slow or long-playing tape speed, the recording current of the chrominance component may be increased relative to that employed when recording with the normal tape speed. For example, the gain control or chroma amplifier 260 may have its gain regulated in accordance with control voltages $E_3$ and $E_4$ selectively applied thereto through a switch $SW_5$ which is ganged or interconnected with switches $SW_1$ and $SW_2$ so as to apply the control voltage $E_3$ during recording with the normal tape speed and the control voltage $E_4$ during recording with the long-playing tape speed. It will be noted that the increase in the gain of the frequency converted chrominance signal applied to mixing circuit 233 for combining with the frequency modulated luminance component during recording with the long-playing tape speed can improve the S/N ratio of the chrominance component without including any beats in the luminance component. As previously mentioned, during recording with the long-playing tape speed, the amounts of emphasis provided in processing circuit 131 and the corresponding amounts of de-emphasis provided in circuit 133 during the reproducing operation are extremely large so as to attenuate or eliminate the conspicuous beat signal of the luminance component with the chrominance component that results from the increased or relatively large recording current of the chrominance component.

Furthermore, it will be understood that the recording and reproducing apparatus 230 will have the usual audio circuits (not shown) for recording and reproducing the audio signals associated with the previously mentioned color video signals. As is conventional, the audio signals will be recorded along a longitudinal edge portion of tape T which is remote from the longitudinal edge portion along which the control signals CTL are shown to be recorded on FIGS. 4A and 4B. Such audio circuits will have the usual equalizing and biasing circuits (not shown). During recording and reproducing with the normal tape speed, the equalizing circuit will be suitably controlled for example, by change-over of a switch or switches ganged with the switches $SW_1$-$SW_5$, so as to provide an amount of equalization less than that provided during recording and reproducing with the slow or long-playing tape speed, whereas the biasing circuit will be similarly controlled to provide a bias current when recording and reproducing with the normal tape speed that is less than the bias current provided when recording and reproducing with the long-playing tape speed.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In apparatus for recording signals of varying level extending over a predetermined frequency band, and which comprises modulating means for frequency modulating a carrier with said signals to provide frequency modulated signals, and transducer means receiving said frequency modulated signals and scanning a record medium for recording said frequency modulated signals in successive parallel tracks thereon; signal processing means operative on said signals in advance of the frequency modulation of said carrier therewith and including first non-linear pre-emphasizing means for providing an amount of emphasis to said signals which is dependent on both the level and frequency of said signals, and second non-linear pre-emphasizing means acting on said signals following the emphasis of the latter by said first non-linear pre-emphasising means for providing a second amount of emphasis to said signals which is different from the first mentioned amount of emphasis and also dependent on both the level and frequency of said signals.

2. Apparatus according to claim 1; in which said first non-linear pre-emphasizing means includes a first pre-emphasis circuit applying a first gain to said signals which increases progressively to a maximum value with increases in the frequency of said signals over a predetermined frequency range of said band starting at a first cut-off frequency, and a first compressing circuit acting on the output of said first pre-emphasis circuit and compressing said output by increasing amounts in correspondence with increasing levels and increasing frequencies thereof; and in which said second non-linear pre-emphasizing means includes at least a second pre-emphasis circuit and a second compressing circuit acting on the output of each said pre-emphasizing circuit of the second non-linear pre-emphasizing means and compressing the same by increasing amounts in correspondence with increasing levels and increasing frequencies thereof.

3. Apparatus according to claim 2; in which said compressing amounts of said second compressing circuit are smaller than said compressing amounts of said first compressing circuit for corresponding levels and frequencies of said signals.

4. Apparatus according to claim 2, in which said second pre-emphasis circuit applies to said signals a second gain which increases progressively to a maximum value substantially smaller than said maximum value of the first gain with increases in the frequency of said signals from a second cut-off frequency lower than said first cut-off frequency, and said second non-linear pre-emphasizing means further includes a third pre-emphasis circuit which applies to said signals over a relatively narrow high-frequency range of said band a third gain which is relatively larger than said maximum value of the first gain.

5. Apparatus according to claim 1; further comprising means for shifting the carrier frequency of the frequency modulated signals between different first and second carrier frequencies which are in frequency interleaving relation to each other, and means for controlling said shifting of the carrier frequency so as to record said frequency modulated signals with said first and second carrier frequencies, respectively, in tracks which are next adjacent each other.

6. Apparatus according to claim 5; in which said signals are at least a portion of video signals; and in which said first and second carrier frequencies differ from each other by $(m+\frac{1}{2})f_H$ in which m is a whole positive integer and $f_H$ is the horizontal synchronizing signal frequency of the video signals.

7. Apparatus according to claim 1; in which said signals are the luminance component of color video signals which further have a chrominance component; and further comprising means for frequency converting said chrominance component to a lower frequency band than that of the frequency modulated luminance component, and means for combining the frequency converted chrominance component with the frequency modulated luminance component to provide a composite signal for recording on the record medium.

8. Apparatus according to claim 7; in which said chrominance component of the color video signals has an original carrier frequency; and in which said means for frequency converting said chrominance component includes a frequency converter receiving said chrominance component with said original carrier frequency thereof, and means for producing a frequency converting signal supplied to said frequency converter for causing the latter to convert said original carrier frequency to a relatively lower carrier frequency.

9. Apparatus according to claim 8; in which said original and relatively lower carrier frequencies of the chrominance component are in frequency interleaving relation to each other and to the horizontal synchronizing signal frequency of the video signals.

10. Apparatus according to claim 9; in which said relatively lower carrier frequency has its second harmonic in frequency interleaving relation to said horizontal synchronizing signal frequency of the video signals.

11. Apparatus according to claim 10; in which said relatively lower carrier frequency of the frequency converted chrominance component is selected to satisfy the following equation:

$$f_c = \tfrac{1}{4} f_H (2m - 1)$$

in which $f_c$ is said relatively lower carrier frequency, $f_H$ is said horizontal synchronizing signal frequency of the video signals, and m is a whole positive integer.

12. Apparatus according to claim 1; in which said record medium is magnetic, said transducer means includes first and second magnetic transducers for recording the video signals in said next adjacent tracks, respectively, and said first and second transducers have gaps with substantially different azimuth angles.

13. Apparatus according to claim 1; in which said signals are the luminance component of color video signals which further have a chrominance component and which are comprised of field intervals and predetermined numbers of line intervals included in each field interval and being recorded in respective areas of said successive parallel tracks; and further comprising means for providing different first and second carriers for said chrominance component, carrier selecting means for alternatively selecting the first and second carriers for said chrominance component to be recorded in the tracks, and control means for the carrier selecting means operative to cause the recording of said chrominance component with the first and second carriers therefor, respectively, in said tracks which are next adjacent each other.

14. Apparatus according to claim 13, in which said first and second carriers for the chrominance component have different polarity characteristics.

15. Apparatus according to claim 14; in which the polarity of said first carrier for the chrominance component is constant during successive line intervals of the video signals being recorded in one of the tracks, and the polarity of the second carrier for the chrominance component is reversed after each predetermined number of said line intervals of the video signals being recorded in the next adjacent track.

16. Apparatus according to claim 13, further comprising means for recording on the record medium control signals which are in predetermined positional relation to said tracks and which identify the tracks having the chrominance component of color video signals recorded therein with said first and second carriers, respectively.

17. Apparatus for recording on a magnetic tape signals of varying level extending over a pre-determined frequency band; which apparatus comprises modulating means for frequency modulating a carrier with said signals to provide frequency modulated signals, transducer means including first and second magnetic heads alternatively traversing the tape at a steady rate and receiving said frequency modulated signals for recording the latter in successive parallel tracks on the tape, drive means for selectively moving said tape at a first relatively slow tape speed by which said heads are made to scan overlapping areas on said tape to provide said tracks in abutting relation and with the widths of said tracks being less than the widths of said heads, and at a second relatively fast tape speed by which said tracks are spaced apart to provide guard bands therebetween and the widths of the tracks are equal to said widths of the heads, first signal processing means operative on said signals in advance of the frequency modulation of said carrier therewith and including non-linear pre-emphasizing means for providing an amount of emphasis to said signals which is dependent on both the level and frequency of said signals, second signal processing means operative on said signals in advance of the frequency modulation thereof for providing an amount of emphasis to said signals which is dependent on the frequency of said signals, and switching means for selectively making operative said first signal processing means and said second signal processing means when the tape is moved at said first and second tape speeds, respectively.

18. Apparatus according to claim 17; in which said signals are at least a component of video signals which are comprised of field intervals and predetermined numbers of line intervals included in each field interval and being recorded in respective areas of said successive parallel tracks; the ends of the margins between successive areas in which said line intervals are recorded in each of said tracks are aligned, in the direction transverse to the lengths of the tracks, with the adjacent ends of the margins between the successive areas in which said line intervals are recorded in the next adjacent tracks to provide H-alignment at said second tape speed, so that said H-alignment is absent when the tape is moved at said first tape speed; and said first signal processing means includes second non-linear pre-emphasizing means acting on said signals following the emphasis of the latter by the first mentioned non-linear pre-emphasizing means for providing a second amount of emphasis to said signals which is different from the first mentioned amount of emphasis and also dependent on both the level and frequency of said signals.

19. Apparatus according to claim 18, in which said first non-linear pre-emphasizing means includes a first pre-emphasis circuit applying a first gain to said signals which increases progressively to a maximum value with increases in the frequency of said signals over a predetermined frequency range of said band starting at a first cut-off frequency, and a first compressing circuit acting on the output of said first pre-emphasis circuit and compressing said output by increasing amounts in correspondence with increasing levels and increasing frequencies thereof; and in which said second non-linear pre-emphasizing means includes at least a second pre-emphasis circuit and a second compressing circuit acting on the output of each said pre-emphasizing circuit of the second non-linear pre-emphasizing means and compressing the same by increasing amounts in correspondence with increasing levels and increasing frequencies thereof.

20. Apparatus according to claim 19, in which said compressing amounts of said second compressing circuit are smaller than said compressing amounts of said first compressing circuit for corresponding levels and frequencies of said signals.

21. Apparatus according to claim 19, in which said second pre-emphasis circuit applies to said signals a second gain which increases progressively to a maximum value substantially smaller than said maximum value of the first gain with increases in the frequency of said signals from a second cut-off frequency lower than said first cut-off frequency, and said second non-linear pre-emphasizing means further includes a third pre-emphasis circuit which applies to said signals over a relatively narrow high-frequency range of said band a third gain which is relatively larger than said maximum value of the first gain.

22. Apparatus according to claim 18, further comprising means operative at least when the tape is moved at said first tape speed for shifting the carrier frequency of the frequency modulated signals between different first and second carrier frequencies which are in frequency interleaving relation to each other, and means for controlling said shifting of the carrier frequency so as to record said frequency modulated signals with said first and second carrier frequencies, respectively, in tracks which are next adjacent each other.

23. Apparatus for recording and reproducing video signals in successive parallel tracks on a record medium, comprising:
   transducer means for scanning said successive parallel tracks on the record medium;
   a recording section including modulating means for frequency modulating at least a portion of said video signals on a carrier, record signal processing means operative on at least said portion of the video signals in advance of the frequency modulation of said carrier therewith and including first non-linear pre-emphasizing means for providing a first amount of emphasis to at least said portion of the video signals which is dependent on both the level and frequency of the latter, second non-linear pre-emphasizing means acting on said portion of the video signals following the emphasis of the latter by said first non-linear pre-emphasizing means for providing a second amount of emphasis thereto which is different from said first amount of emphasis and also dependent on both the level and frequency of said signals, and means for applying the resulting frequency modulated signals from said modulating means to said transducer means for recording by the latter in said tracks scanned thereby; and
   a reproducing section including demodulating means for frequency demodulating the frequency modulated signals reproduced by said transducer means from the successive parallel tracks on the record medium, and reproduced signal processing means operative on the demodulated signals from said demodulating means and including first non-linear de-emphasizing means for providing an amount of de-emphasis to said demodulated signals which is substantially complementary to said first amount of emphasis and which is dependent on both the level and frequency of said demodulated signals, and second non-linear de-emphasizing means acting on said demodulated signals for providing a second amount of de-emphasis thereby which is substantially complementary to said second amount of emphasis and which is dependent on both the level and frequency of said demodulated signals, said amounts of emphasis and de-emphasis by said first non-linear pre-emphasizing and de-emphasizing means being suitable to substantially eliminate the FM noise signal from said demodulated signals, and said amounts of emphasis and de-emphasis by said second non-linear pre-emphasizing and de-emphasizing means being suitable to substantially eliminate the interfering signal due to cross-talk from said demodulated signal.

24. Apparatus according to claim 23, in which said first non-linear pre-emphasizing means includes a first pre-emphasis circuit applying a first gain to said signal which increases progressively to a maximum value with increases in the frequency of said portion of the video signals over a predetermined frequency range of said band starting at a first cut-off frequency, and a first compressing circuit acting on the output of said first pre-emphasis circuit and compressing said output by increasing amounts in correspondence with increasing levels and increasing frequencies thereof; said second non-linear pre-emphasizing means includes at least a second pre-emphasis circuit and a second compressing circuit acting on the output of each said pre-emphasizing circuit of the second non-linear pre-emphasizing means and compressing the same by increasing amounts in correspondence with increasing levels and increasing frequencies thereof;
   said non-linear de-emphasizing means includes a first de-emphasis circuit applying a gain to said demodulated signals which decreases progressively to a minimum value with increases in the frequencies of said demodulated signals over said predetermined frequency range of said band starting at said first cut-off frequency, and a first expanding circuit acting on said demodulated signals and expanding the latter by increasing amounts in correspondence with increasing levels and increasing frequencies thereof; and in which said second non-linear de-emphasizing means includes at least a second de-emphasis circuit and a second expanding circuit acting on the demodulated signals and expanding the same by increasing the amounts in correspondence with increasing levels and increasing frequencies thereof.

25. Apparatus according to claim 24; in which said compressing and expanding amounts of said second compressing and expanding circuits are smaller than said compressing and expanding amounts of said first compressing and expanding circuits, respectively, for corresponding levels and frequencies of said signals.

26. Apparatus according to claim 24, in which said reproduced signal processing means has trap circuit means for substantially attenuating said demodulated signals in said relatively high-frequency range of said band and at frequencies approximately twice said narrow high-frequency range, respectively.

27. Apparatus according to claim 24, in which said second expanding circuit includes transistor means of variable gain, first and second diode means for determining the gain of said transistor means in respect to positive and negative demodulated signals, respectively, and means for differently biasing said first and second diode means so that said second expanding circuit provides more expansion to positive overshoots than to negative overshoots.

28. Apparatus according to claim 24, in which said second pre-emphasis circuit applies to said portion of the video signals a second gain which increases progressively to a maximum value substantially smaller than said maximum value of the first gain with increases in the frequency of said signals from a second cut-off frequency lower than said first cut-off frequency, and said second non-linear pre-emphasizing means further includes a third pre-emphasis circuit which applies to said portion of the video signals over a relatively narrow high-frequency range of said band a third gain which is relatively larger than said maximum value of the first gain; and in which said second de-emphasis circuit applies to said demodulated signals a gain which decreases progressively to a minimum value substantially above said minimum value of the gain of said first de-emphasis circuit with increases in the frequency of said demodulated signals from said second cut-off frequency, and said second non-linear de-emphasizing means further includes a third de-emphasis circuit which applies to said demodulated signals over a relatively narrow high-frequency range of said band a gain which is relatively lower than said minimum value of said gain of the first de-emphasis circuit.

29. Apparatus according to claim 23, in which said recording section further includes means for shifting the carrier frequency of the frequency modulated signals between different first and second carrier frequencies which are in frequency interleaving relation to each other, and means for controlling said shifting of the carrier frequency so as to record said frequency modulated signals with said first and second carrier frequencies, respectively, in tracks which are next adjacent each other; and in which said reproducing section includes means for eliminating from the demodulated signals the changes in levels thereof corresponding to said different first and second carrier frequencies with which the frequency modulated signals were recorded in the next adjacent tracks, respectively.

30. Apparatus according to claim 23, in which said video signals are color video signals containing a luminance component which constitutes said portion of the video signals and further containing a chrominance component having an original carrier frequency; and in which said recording section further includes means for frequency converting said chrominance component to a lower frequency band than that of the frequency modulated luminance component, and means for combining the frequency converted chrominance component with the frequency modulated luminance component to provide a composite signal for recording on the record medium; and said reproducing section further includes means for individually separating the frequency modulated luminance component and the frequency converted chrominance component from the reproduced composite signals, and means for frequency reconverting the separated frequency converted chrominance component back to said original carrier frequency therefor.

31. Apparatus according to claim 30; in which said means for frequency converting said chrominance component includes a frequency converter receiving said chrominance component with said original carrier frequency thereof, and means for producing a frequency converting signal supplied to said frequency converter for causing the latter to convert said original carrier frequency to a relatively lower carrier frequency; and in which said means for frequency reconverting the separated frequency converted chrominance component includes another frequency converter receiving said separated frequency converted chrominance component of the reproduced composite signals, and means for producing a frequency reconverting signal supplied to said other frequency converter for causing the latter to convert said relatively lower carrier frequency to said original carrier frequency.

32. Apparatus according to claim 31, in which said original and relatively lower carrier frequencies of the chrominance component are in frequency interleaving relation to each other and to the horizontal synchronizing signal frequency of the video signals.

33. Apparatus according to claim 32, in which said relatively lower carrier frequency has its second harmonic in frequency interleaving relation to said horizontal synchronizing signal frequency of the video signals.

34. Apparatus according to claim 33, in which said relatively lower carrier frequency of the frequency converted chrominance component is selected to satisfy the following equation:

$$f_c = \tfrac{1}{4} f_H (2m - 1)$$

in which $f_c$ is said relatively lower carrier frequency, $f_H$ is said horizontal synchronizing signal frequency of the video signals, and m is a whole positive integer.

35. Apparatus according to claim 23 in which said record medium is magnetic, said transducer means includes first and second magnetic transducers for recording and reproducing the video signals in said next adjacent tracks, respectively, and said first and second transducers have gaps with substantially different azimuth angles.

36. Apparatus according to claim 23; in which said video signals are color video signals comprised of field intervals and predetermined numbers of line intervals included in each field interval and being recorded in respective areas of said successive parallel tracks, and said color video signals contain a luminance component which constitutes said portion of the video signals and a chrominance component; said recording section further includes means for providing different first and second carriers for said chrominance component, carrier selecting means for alternatively selecting the first and second carriers for said chrominance signals to be recorded in the tracks, and control means for the carrier selecting means operative to cause the recording of said chrominance component with the first and second carriers therefor, respectively, in said tracks which are next adjacent each other; and said reproducing section further includes transducer means for reproducing the frequency modulated luminance component and the chrominance component recorded in each of the tracks along with cross-talk signals from tracks next adjacent thereto, and means for providing the chrominance component reproduced from each of said tracks with a common carrier and for eliminating the cross-talk signals therefrom on the basis of said different first and second carriers with which the chrominance component is recorded in the tracks which are next adjacent each other.

37. Apparatus according to claim 36, in which said means for eliminating the cross-talk signals includes a comb filter.

38. Apparatus according to claim 36, in which said first and second carriers for the chrominance component have different polarity characteristics.

39. Apparatus according to claim 38, in which the polarity of said first carrier for the chrominance component is constant during successive line intervals of the video signals being recorded in one of the tracks, and the polarity of the second carrier for the chrominance component is reversed after each predetermined number of said line intervals of the video signals being recorded in the next adjacent track.

40. Apparatus for recording and reproducing video signals in successive parallel tracks on a magnetic tape signals of varying level extending over a predetermined frequency band; said apparatus comprising:

transducer means including first and second magnetic heads alternatively traversing said tape at a steady rate;

drive means for selectively moving said tape at a first relatively slow tape speed by which said heads are made to scan overlapping areas on said tape to provide said tracks in abutting relation and with track widths smaller than the widths of said heads, and at a second relatively fast tape speed by which said tracks are spaced apart to provide guard bands therebetween and track widths equal to said head widths;

a recording section including modulating means for frequency modulating at least a portion of said video signals on a carrier, first record signal processing means operative on at least said portion of the video signals in advance of the frequency modulation of said carrier therewith and including non-linear pre-emphasizing means for providing a first amount of emphasis to at least said portion of the video signals which is dependent on both the level and frequency of the latter, second record signal processing means in said recording section operative on at least said portion of the video signals in advance of the frequency modulation thereof for providing an amount of emphasis thereto which is dependent on the frequency of said portion of the video signals, and means for applying the resulting frequency modulated signals from said modulating means to said transducer means for recording by the latter in said tracks scanned thereby; and a reproducing section including demodulating means for frequency demodulating the frequency modulated signals reproduced by said transducer means from the successive parallel tracks on the record medium, first reproduced signal processing means operative on the demodulated signals from said demodulating means and including non-linear de-emphasizing means for providing a first amount of de-emphasis to said demodulated signals which is substantially complementary to said first amount of emphasis and which is dependent on both the level and frequency of said demodulated signals, and second reproduced signal processing means operative on said demodulated signals for providing an amount of de-emphasis to said demodulated signals which is substantially complementary to said amount of emphasis provided by said second record signal processing means and which is dependent on the frequency of said demodulated signals, and switching means for selectively making operative the first mentioned record signal processing means and the first mentioned reproduced signal processing means when the tape is moved at a first tape speed and for selectively making operative said second record signal processing means and said second reproduced signal processing means when the tape is moved at said second tape speed.

41. Apparatus according to claim 40, in which said video signals are comprised of field and predetermined numbers of line intervals included in each field interval and which are recorded in respective areas of said successive parallel tracks; the ends of the margins between successive areas in which said line intervals are recorded in each of said tracks are aligned, in the direction transverse to the lengths of the tracks, with the adjacent ends of the margins between the successive areas in which said line intervals are recorded in the next adjacent tracks to provide H-alignment at said second tape speed, so that said H-alignment is absent when the tape is moved at said first tape speed; said first record signal processing means further includes second non-linear pre-emphasizing means acting on said portion of the video signals following the emphasis of the latter by the first mentioned non-linear pre-emphasizing means for providing a second amount of emphasis to said portion of the video signals which is different from the first mentioned amount of emphasis and also dependent on both the level and frequency of said portion of the video signals; and said first reproduced signal processing means further includes second non-linear de-emphasizing means acting on said demodulated signals for providing a second amount of de-emphasis complementary to said second amount of emphasis and being dependent on both the level and frequency of said demodulated signals.

42. Apparatus for reproducing video signals which are recorded in successive parallel tracks on a record medium with at least a portion of the video signals, as recorded in said tracks, being non-linearly pre-emphasized with a first amount of emphasis dependent on both the level and frequency of said portion of the video signals and with a second amount of emphasis which is different from the first mentioned amount of emphasis and also dependent on both the level and frequency of said signals, and then being frequency modulated on a carrier; said apparatus comprising transducer means for scanning said successive parallel tracks and reproducing the signals recorded therein, demodulating means for frequency demodulating the frequency modulated signals reproduced by said transducer means, and reproduced signal processing means operative on the demodulated signal from said demodulating means and including first non-linear de-emphasizing means for providing a first amount of de-emphasis to said demodulated signals which is substantially complementary to said first amount of emphasis and which is dependent on both the level and frequency of said demodulated signals, and second non-linear de-emphasizing means acting on said demodulated signals for providing a second amount of de-emphasis thereto which is substantially complementary to said second amount of emphasis and which is dependent on both the level and frequency of said demodulated signals, said first amounts of emphasis and de-emphasis being suitable to substantially eliminate the FM noise signal from said demodulated signals, and said second amounts of emphasis and de-emphasis being suitable to substantially eliminate the interfering signal due to cross-talk from said demodulated signals.

43. Apparatus according to claim 42, in which the first mentioned non-linear de-emphasizing means includes a first de-emphasis circuit applying a gain to said demodulated signals which decreases progressively to a minimum value with increases in the frequency of said demodulated signals over a predetermined frequency range of said band starting at a first cut-off frequency, and a first expanding circuit acting on said demodulated signals and expanding the latter by increasing amounts in correspondence with increasing levels and increasing frequencies thereof; and in which said second non-linear de-emphasizing means include at least a second de-emphasis circuit and a second extending circuit acting on the demodulated signals and expanding the same by increasing amounts in correspondence with increasing levels and increasing frequencies thereof.

44. Apparatus according to claim 43, in which said expanding amounts of said second expanding circuit are smaller than said expanding amounts of said first expanding circuit for corresponding levels and frequencies of said signals.

45. Apparatus according to claim 43, in which said reproduced signal processing means has trap circuit means for substantially attenuating said demodulated signals in said relatively narrow high-frequency range of said band and at frequencies approximately twice said narrow high-frequency range, respectively.

46. Apparatus according to claim 43, in which said second expanding circuit includes transistor means of variable gain, first and second diode means for determining the gain of said transistor means in respect to positive and negative demodulated signals, respectively, and means for differently biasing said first and second diode means so that said second expanding circuit provides more expansion to positive overshoots than to negative overshoots.

47. Apparatus according to claim 43, in which said second de-emphasis circuit applies to said demodulated signals a gain which decreases progressively to a minimum value substantially above said minimum value of the gain of said first de-emphasis circuit with increases in the frequency of said demodulated signals from a second cut-off frequency, and said second non-linear de-emphasizing means further includes a third de-emphasis circuit which applies to said demodulated signals over a relatively narrow high-frequency range of said band a gain which is relatively lower than said minimum value of said gain of the first de-emphasis circuit.

48. Apparatus according to claim 42, in which the frequency modulated signals recorded in tracks which are next adjacent thereto have different first and second carrier frequencies which are in frequency interleaving relation to each other; and in which said reproduced signal processing means includes means for eliminating from the demodulated signals the changes in levels thereof corresponding to said different first and second carrier frequencies with which the frequency modulated signals were recorded in the next adjacent tracks, respectively.

49. Apparatus according to claim 42; in which said video signals are color video signals containing a luminance component which constitutes said portion of the video signals and further containing a chrominance component having an original carrier frequency, and said chrominance component is frequency converted to a lower frequency band than that of the frequency modulated luminance component and combined with the latter to provide a composite signal which is recorded in said tracks on the record medium; and further comprising means for individually separating the frequency modulated luminance component and the frequency converted chrominance component from the reproduced composite signals, and means for frequency reconverting the separated frequency converted chrominance component back to said original carrier frequency therefor.

50. Apparatus according to claim 49, in which said means for frequency reconverting the separated frequency converted chrominance component includes a frequency converter receiving said separated frequency converted chrominance component of the reproduced composite signals, and means for producing a frequency reconverting signal supplied to said frequency converter for causing the latter to convert said relatively lower carrier frequency to said original carrier frequency.

51. Apparatus according to claim 50, in which said original and relatively lower carrier frequencies of the chrominance component are in frequency interleaving relation to each other and to the horizontal synchronizing signal frequency of the video signals.

52. Apparatus according to claim 51, in which said relatively lower carrier frequency has its second harmonic in frequency interleaving relation to said horizontal synchronizing signal frequency of the video signals.

53. Apparatus according to claim 52; in which said relatively lower carrier frequency of the frequency converted chrominance component is selected to satisfy the following equation:

$$f_c = \tfrac{1}{4}(f_H(2m-1))$$

in which $f_c$ is said relatively lower carrier frequency, $f_H$ is said horizontal synchronizing signal frequency of the video signals, and m is a whole positive integer.

54. Apparatus according to claim 42; in which the signals are recorded in the next adjacent tracks with different azimuths; and in which said transducer means includes first and second magnetic transducers having gaps with different azimuths corresponding to the azimuths of the signals recorded in the next adjacent tracks and respectively reproducing the signals recorded in the latter.

55. Apparatus according to claim 42; in which said video signals are color video signals comprised of field intervals and predetermined numbers of line intervals included in each field interval and being recorded in respective areas of said successive parallel tracks, and said color video signals contain a luminance component which constitutes said portion of the video signals and a chrominance component which is recorded with different first and second carriers in said tracks which are next adjacent each other; and in which said transducer means reproduces the frequency modulated luminance component and the chrominance component recorded in each of the tracks along with cross-talk signals from tracks next adjacent thereto; further comprising means for providing the chrominance component reproduced from each of said tracks with a common carrier and for eliminating the cross-talk signals therefrom on the basis of said different first and second carriers with which the chrominance component is recorded in the tracks which are next adjacent each other.

56. Apparatus according to claim 55, in which said means for eliminating the cross-talk signals includes a comb filter.

57. Apparatus according to claim 55, in which said first and second carriers for the chrominance component have different polarity characteristics.

58. Apparatus according to claim 57, in which the polarity of said first carrier for the chrominance component is constant during successive line intervals of the video signals being recorded in one of the tracks, and the polarity of the second carrier for the chrominance component is reversed after each predetermined number of said intervals of the video signals being recorded in the next adjacent track.

59. Apparatus for reproducing video signals which are recorded in successive parallel tracks on a magnetic tape with at least a portion of the video signals, as recorded in said tracks, being non-linearly pre-emphasized with an amount of emphasis dependent on both the level and frequency of said portion of the video signals and then being frequency modulated on a carrier; said apparatus comprising transducer means including first and second magnetic heads alternately traversing said tape at a steady rate for scanning said successive parallel tracks and reproducing the signals recorded therein, demodulating means for frequency demodulating the frequency modulated signals reproduced by said transducer means, drive means for selectively moving said tape at a first relatively slow tape speed by which said heads are made to scan overlapping areas on said tape for reproducing signals recorded in tracks which are in abutting relation and which have track widths smaller than the widths of said heads, and at a second relatively fast tape speed by which said heads are made to scan spaced apart areas for reproducing signals recorded in tracks which are similarly spaced apart to provide guard bands therebetween and track widths equal to said head widths, said portion of the video signals being pre-emphasized with a second amount of emphasis which is smaller than the first mentioned amount of emphasis and dependent only on the frequency of said portion of the video signals when the signals are recorded in said spaced apart tracks, first reproduced signal processing means operative on the demodulated signals from said demodulating means and including non-linear de-emphasizing means for providing an amount of de-emphasis to said demodulated signals which is substantially complementary to the first mentioned amount of emphasis and which is dependent on both the level and frequency of said demodulated signals, second reproduced signal processing means operative on said demodulated signals for providing an amount of de-emphasis to said demodulated signals which is substantially complementary to said second amount of emphasis and which is dependent on the frequency of said demodulated signals, and switching means for selectively making operative the first mentioned reproduced signal processing means when the tape is moved at said first tape and for selectively making operative said second reproduced signal processing means when the tape is moved at said second tape speed.

60. Apparatus according to claim 59, in which said video signals are comprsed of field intervals and predetermined numbers of line intervals included in each field interval and which are recorded in respective areas of said successive parallel tracks; the ends of the margins between successive areas in which said line intervals are recorded in each of said tracks are aligned, in the direction transverse to the lengths of the tracks, with the adjacent ends of the margins between the successive areas in which said line intervals are recorded in the next adjacent tracks to provide H-alignment for recording at said second tape speed, so that said H-alignment is absent for recording at said first tape speed; for recording at said first tape speed, said portion of the video signals is further pre-emphasized with an additional amount of emphasis which is different from the first mentioned amount of emphasis and also dependent on both the level and frequency of said portion of the video signals; and said reproduced signal processing means further includes second non-linear de-emphasizing means acting on said demodulated signals for providing an additional amount of de-emphasis complementary to said additional amount of emphasis and being dependent on both the level and frequency of said demodulated signals.

* * * * *